(12) United States Patent
Barfonchovski et al.

(10) Patent No.: US 10,462,123 B2
(45) Date of Patent: Oct. 29, 2019

(54) SYSTEMS AND METHODS FOR CLONING AN AGENT IN A DISTRIBUTED ENVIRONMENT

(71) Applicant: VMware, Inc., Palo Alto, CA (US)

(72) Inventors: Dimitar Hristov Barfonchovski, Sofia (BG); Dimitar Ivanov, Sofia (BG); Anna Delcheva, Sofia (BG); Evgeny Aronov, Sofia (BG)

(73) Assignee: VMware, Inc., Palo Alto, CA (US)

(*) Notice: Subject to any disclaimer, the term of this patent is extended or adjusted under 35 U.S.C. 154(b) by 102 days.

(21) Appl. No.: 15/370,569

(22) Filed: Dec. 6, 2016

(65) Prior Publication Data
US 2018/0159844 A1    Jun. 7, 2018

(51) Int. Cl.
| | |
|---|---|
| *H04L 29/06* | (2006.01) |
| *H04L 12/24* | (2006.01) |
| *H04L 12/28* | (2006.01) |
| *G06F 9/455* | (2018.01) |
| *H04L 12/46* | (2006.01) |
| *G06F 8/60* | (2018.01) |

(52) U.S. Cl.
CPC .......... *H04L 63/0823* (2013.01); *G06F 8/60* (2013.01); *G06F 9/45558* (2013.01); *H04L 12/2816* (2013.01); *H04L 12/4625* (2013.01); *H04L 41/046* (2013.01); *H04L 41/0806* (2013.01); *G06F 2009/45587* (2013.01)

(58) Field of Classification Search
CPC combination set(s) only.
See application file for complete search history.

(56) References Cited

U.S. PATENT DOCUMENTS

| | | | |
|---|---|---|---|
| 8,739,257 B1* | 5/2014 | Robinson | ................ G06F 21/44 |
| | | | 713/168 |
| 9,092,248 B1* | 7/2015 | Makin | ................. G06F 9/45558 |
| | | (Continued) | |

OTHER PUBLICATIONS

United States Patent and Trademark Office, "Non-Final Office action," issued in connection with U.S. Appl. No. 15/370,677 dated Aug. 27, 2018, 14 pages.

(Continued)

*Primary Examiner* — Khoi V Le
(74) *Attorney, Agent, or Firm* — Hanley, Flight and Zimmerman, LLC

(57) ABSTRACT

Methods and apparatus to clone an agent in a distributed environment are disclosed. An example apparatus includes a first management agent associated with a first component server in a virtualization environment, the first management agent configured to facilitate communication between the first component server and a virtual appliance, the virtual appliance to authenticate the first management agent based on first credentials including a first identifier and a first certificate. The example apparatus includes a second management agent associated with a second component server in the virtualization environment, the second management agent cloned from the first management agent and including a copy of the first credentials. The example second management agent is to: generate second credentials including a second identifier and a second certificate; authenticate with the virtual appliance based on the first identifier and the first certificate; and delete the copy of the first credentials.

17 Claims, 12 Drawing Sheets

(56) References Cited

U.S. PATENT DOCUMENTS

| | | | |
|---|---|---|---|
| 9,152,446 B2* | 10/2015 | Ansel | G06F 9/45504 |
| 9,386,079 B2 | 7/2016 | Ramalingam et al. | |
| 9,471,474 B2 | 10/2016 | Gurumurthy et al. | |
| 9,773,122 B2 | 9/2017 | Betzler et al. | |
| 2008/0134176 A1 | 6/2008 | Fitzgerald et al. | |
| 2010/0293409 A1 | 11/2010 | Machida | |
| 2011/0154320 A1* | 6/2011 | Verma | G06F 8/63 718/1 |
| 2011/0173605 A1 | 7/2011 | Bourne | |
| 2012/0054486 A1* | 3/2012 | Lakkavalli | G06F 21/57 713/156 |
| 2012/0117381 A1 | 5/2012 | Lo et al. | |
| 2012/0233299 A1* | 9/2012 | Attanasio | G06F 8/60 709/220 |
| 2013/0018994 A1 | 1/2013 | Flavel et al. | |
| 2013/0232497 A1 | 9/2013 | Jalagam et al. | |
| 2013/0247136 A1 | 9/2013 | Chieu et al. | |
| 2013/0297964 A1 | 11/2013 | Hegdal et al. | |
| 2014/0208111 A1 | 7/2014 | Brandwine et al. | |
| 2015/0052402 A1 | 2/2015 | Gurumurthy et al. | |
| 2015/0074743 A1 | 3/2015 | Ilieva et al. | |
| 2015/0180653 A1 | 6/2015 | Nix | |
| 2015/0215308 A1 | 7/2015 | Manolov et al. | |
| 2015/0222604 A1 | 8/2015 | Ylonen | |
| 2015/0312116 A1 | 10/2015 | Taheri et al. | |
| 2015/0324182 A1 | 11/2015 | Barros et al. | |
| 2015/0339113 A1 | 11/2015 | Dorman et al. | |
| 2015/0347264 A1 | 12/2015 | Mohammed et al. | |
| 2015/0358392 A1 | 12/2015 | Ramalingam et al. | |
| 2016/0285832 A1 | 9/2016 | Petrov et al. | |
| 2017/0222981 A1 | 8/2017 | Srivastav et al. | |
| 2018/0157550 A1 | 6/2018 | Ivanov et al. | |
| 2018/0159721 A1 | 6/2018 | Delcheva et al. | |
| 2018/0159845 A1 | 6/2018 | Aronov et al. | |

OTHER PUBLICATIONS

United States Patent and Trademark Office, "Non-Final Office action," issued in connection with U.S. Appl. No. 15/370,626, dated Aug. 27, 2018, 55 pages.

United States Patent and Trademark Office, "Final Office action," issued in connection with U.S. Appl. No. 15/370,626, dated Jan. 4, 2019, 35 pages.

United States Patent and Trademark Office, "Notice of Allowance," issued in connection with U.S. Appl. No. 15/370,677, dated Feb. 14, 2019, 23 pages.

* cited by examiner

SYSTEMS AND METHODS FOR CLONING AN AGENT IN A DISTRIBUTED ENVIRONMENT

FIELD OF THE DISCLOSURE

The present disclosure relates generally to cloud computing and, more particularly, to methods and apparatus to cloning an agent in a distributed environment such as a cloud computing environment.

BACKGROUND

Virtualizing computer systems provides benefits such as an ability to execute multiple computer systems on a single hardware computer, replicating computer systems, moving computer systems among multiple hardware computers, and so forth.

"Infrastructure-as-a-Service" (also commonly referred to as "IaaS") generally describes a suite of technologies provided as an integrated solution to allow for elastic creation of a virtualized, networked, and pooled computing platform (sometimes referred to as a "cloud computing platform"). Enterprises may use IaaS as a business-internal organizational cloud computing platform (sometimes referred to as a "private cloud") that gives an application developer access to infrastructure resources, such as virtualized servers, storage, and networking resources. By providing ready access to the hardware resources required to run an application, the cloud computing platform enables developers to build, deploy, and manage the lifecycle of a web application (or any other type of networked application) at a greater scale and at a faster pace than ever before.

Cloud computing environments may include many processing units (e.g., servers). Other components of a cloud computing environment include storage devices, networking devices (e.g., switches), etc. Current cloud computing environment configuration relies on much manual user input and configuration to install, configure, and deploy the components of the cloud computing environment.

DETAILED DESCRIPTION

Figure 1:
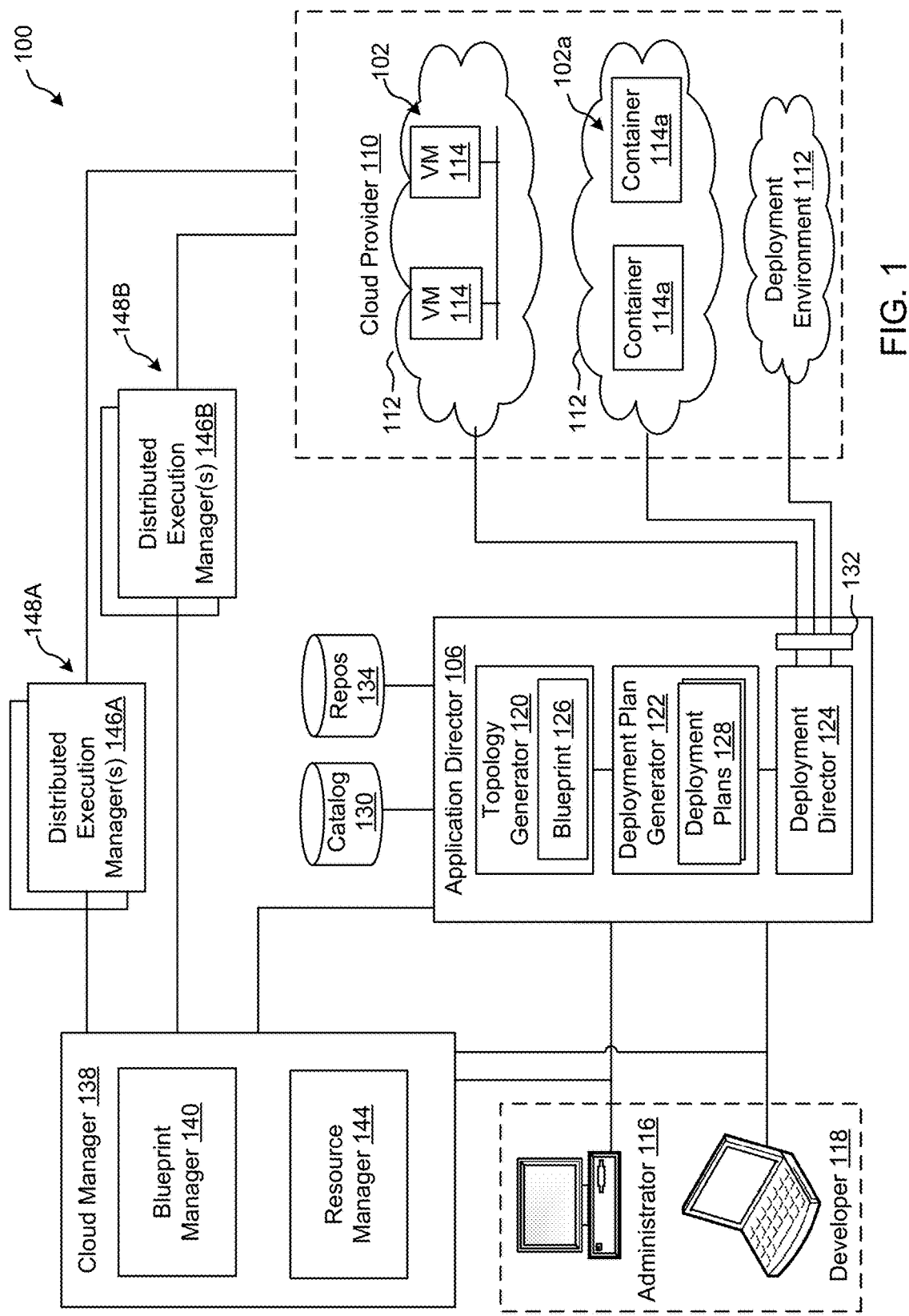
FIG. 1 depicts an example system constructed in accordance with the teachings of this disclosure for managing a cloud computing platform.

Cloud computing is based on the deployment of many physical resources across a network, virtualizing the physical resources into virtual resources, and provisioning the virtual resources to perform cloud computing services and applications. Example systems for virtualizing computer systems are described in U.S. patent application Ser. No. 11/903,374, entitled "METHOD AND SYSTEM FOR MANAGING VIRTUAL AND REAL MACHINES," filed Sep. 21, 2007, and granted as U.S. Pat. No. 8,171,485, U.S. Provisional Patent Application No. 60/919,965, entitled "METHOD AND SYSTEM FOR MANAGING VIRTUAL AND REAL MACHINES," filed Mar. 26, 2007, and U.S. Provisional Patent Application No. 61/736,422, entitled "METHODS AND APPARATUS FOR VIRTUALIZED COMPUTING," filed Dec. 12, 2012, all three of which are hereby incorporated herein by reference in their entirety.

Cloud computing platforms may provide many powerful capabilities for performing computing operations. However, taking advantage of these computing capabilities manually may be complex and/or require significant training and/or expertise. Prior techniques to providing cloud computing platforms and services often require customers to understand details and configurations of hardware and software resources to establish and configure the cloud computing platform. Methods and apparatus disclosed herein facilitate the management of virtual machine resources in cloud computing platforms.

A virtual machine is a software computer that, like a physical computer, runs an operating system and applications. An operating system installed on a virtual machine is referred to as a guest operating system. Because each virtual machine is an isolated computing environment, virtual machines (VMs) can be used as desktop or workstation environments, as testing environments, to consolidate server applications, etc. Virtual machines can run on hosts or clusters. The same host can run a plurality of VMs, for example.

As disclosed in detail herein, methods and apparatus disclosed herein provide for automation of management tasks such as provisioning multiple virtual machines for a multiple-machine computing system (e.g., a group of servers that inter-operate), linking provisioned virtual machines and tasks to desired systems to execute those virtual machines or tasks, and/or reclaiming cloud computing resources that are no longer in use. The improvements to cloud management systems (e.g., the vCloud Automation Center (vCAC) from VMware®, the vRealize Automation Cloud Automation Software from VMware®), interfaces, portals, etc. disclosed herein may be utilized individually and/or in any combination. For example, all or a subset of the described improvements may be utilized.

As used herein, availability refers to the level of redundancy required to provide continuous operation expected for the workload domain. As used herein, performance refers to the computer processing unit (CPU) operating speeds (e.g., CPU gigahertz (GHz)), memory (e.g., gigabytes (GB) of random access memory (RAM)), mass storage (e.g., GB hard drive disk (HDD), GB solid state drive (SSD)), and power capabilities of a workload domain. As used herein, capacity refers to the aggregate number of resources (e.g., aggregate storage, aggregate CPU, etc.) across all servers associated with a cluster and/or a workload domain. In examples disclosed herein, the number of resources (e.g., capacity) for a workload domain is determined based on the redundancy, the CPU operating speed, the memory, the storage, the security, and/or the power requirements selected by a user. For example, more resources are required for a workload domain as the user-selected requirements increase (e.g., higher redundancy, CPU speed, memory, storage, security, and/or power options require more resources than lower redundancy, CPU speed, memory, storage, security, and/or power options).

Example Virtualization Environments

Many different types of virtualization environments exist. Three example types of virtualization environment are: full virtualization, paravirtualization, and operating system virtualization.

Full virtualization, as used herein, is a virtualization environment in which hardware resources are managed by a hypervisor to provide virtual hardware resources to a virtual machine. In a full virtualization environment, the virtual machines do not have direct access to the underlying hardware resources. In a typical full virtualization environment, a host operating system with embedded hypervisor (e.g., VMware ESXi®) is installed on the server hardware. Virtual machines including virtual hardware resources are then deployed on the hypervisor. A guest operating system is installed in the virtual machine. The hypervisor manages the association between the hardware resources of the server hardware and the virtual resources allocated to the virtual machines (e.g., associating physical random access memory (RAM) with virtual RAM). Typically, in full virtualization, the virtual machine and the guest operating system have no visibility and/or direct access to the hardware resources of the underlying server. Additionally, in full virtualization, a full guest operating system is typically installed in the virtual machine while a host operating system is installed on the server hardware. Example full virtualization environments include VMware ESX®, Microsoft Hyper-V®, and Kernel Based Virtual Machine (KVM).

Paravirtualization, as used herein, is a virtualization environment in which hardware resources are managed by a hypervisor to provide virtual hardware resources to a virtual machine and guest operating systems are also allowed direct access to some or all of the underlying hardware resources of the server (e.g., without accessing an intermediate virtual hardware resource). In a typical paravirtualization system, a host operating system (e.g., a Linux-based operating system) is installed on the server hardware. A hypervisor (e.g., the Xen® hypervisor) executes on the host operating system. Virtual machines including virtual hardware resources are then deployed on the hypervisor. The hypervisor manages the association between the hardware resources of the server hardware and the virtual resources allocated to the virtual machines (e.g., associating physical random access memory (RAM) with virtual RAM). In paravirtualization, the guest operating system installed in the virtual machine is configured also to have direct access to some or all of the hardware resources of the server. For example, the guest operating system may be precompiled with special drivers that allow the guest operating system to access the hardware resources without passing through a virtual hardware layer. For example, a guest operating system may be precompiled with drivers that allow the guest operating system to access a sound card installed in the server hardware. Directly accessing the hardware (e.g., without accessing the virtual hardware resources of the virtual machine) may be more efficient, may allow for performance of operations that are not supported by the virtual machine and/or the hypervisor, etc.

Operating system virtualization is also referred to herein as container virtualization. As used herein, operating system virtualization refers to a system in which processes are isolated in an operating system. In a typical operating system virtualization system, a host operating system is installed on the server hardware. Alternatively, the host operating system may be installed in a virtual machine of a full virtualization environment or a paravirtualization environment. The host operating system of an operating system virtualization system is configured (e.g., utilizing a customized kernel) to provide isolation and resource management for processes that execute within the host operating system (e.g., applications that execute on the host operating system). The isolation of the processes is known as a container. Several containers may share a host operating system. Thus, a process executing within a container is isolated the process from other processes executing on the host operating system. Thus, operating system virtualization provides isolation and resource management capabilities without the resource overhead utilized by a full virtualization environment or a paravirtualization environment. Alternatively, the host operating system may be installed in a virtual machine of a full virtualization environment or a paravirtualization environment. Example operating system virtualization environments include Linux Containers LXC and LXD, Docker™, OpenVZ™, etc.

In some instances, a data center (or pool of linked data centers) may include multiple different virtualization environments. For example, a data center may include hardware resources that are managed by a full virtualization environment, a paravirtualization environment, and an operating system virtualization environment. In such a data center, a workload may be deployed to any of the virtualization environments.

FIG. 1 depicts an example system 100 constructed in accordance with the teachings of this disclosure for managing a cloud computing platform. The example system 100 includes an application director 106 and a cloud manager 138 to manage a cloud computing platform provider 110 as described in more detail below. As described herein, the example system 100 facilitates management of the cloud provider 110 and does not include the cloud provider 110. Alternatively, the system 100 could be included in the cloud provider 110.

The cloud computing platform provider 110 provisions virtual computing resources (e.g., virtual machines, or "VMs," 114) that may be accessed by users of the cloud computing platform 110 (e.g., users associated with an administrator 116 and/or a developer 118) and/or other programs, software, device. etc.

An example application 102 of FIG. 1 includes multiple VMs 114. The example VMs 114 of FIG. 1 provide different functions within the application 102 (e.g., services, portions of the application 102, etc.). One or more of the VMs 114 of the illustrated example are customized by an administrator 116 and/or a developer 118 of the application 102 relative to a stock or out-of-the-box (e.g., commonly available purchased copy) version of the services and/or application components. Additionally, the services executing on the example VMs 114 may have dependencies on other ones of the VMs 114.

As illustrated in FIG. 1, the example cloud computing platform provider 110 may provide multiple deployment environments 112, for example, for development, testing, staging, and/or production of applications. The administrator 116, the developer 118, other programs, and/or other devices may access services from the cloud computing platform provider 110, for example, via REST (Representational State Transfer) APIs (Application Programming Interface) and/or via any other client-server communication protocol. Example implementations of a REST API for cloud computing services include a vCloud Administrator Center™ (vCAC) and/or vRealize Automation™(vRA) API and a vCloud Director™API available from VMware, Inc. The example cloud computing platform provider 110 provisions virtual computing resources (e.g., the VMs 114) to provide the deployment environments 112 in which the administrator 116 and/or the developer 118 can deploy multi-tier application(s). One particular example implementation of a deployment environment that may be used to implement the deployment environments 112 of FIG. 1 is vCloud DataCenter cloud computing services available from VMware, Inc.

In some examples disclosed herein, a lighter-weight virtualization is employed by using containers in place of the VMs 114 in the development environment 112. Example containers 114a are software constructs that run on top of a host operating system without the need for a hypervisor or a separate guest operating system. Unlike virtual machines, the containers 114a do not instantiate their own operating systems. Like virtual machines, the containers 114a are logically separate from one another. Numerous containers can run on a single computer, processor system and/or in the same development environment 112. Also like virtual machines, the containers 114a can execute instances of applications or programs (e.g., an example application 102a) separate from application/program instances executed by the other containers in the same development environment 112.

The example application director 106 of FIG. 1, which may be running in one or more VMs, orchestrates deployment of multi-tier applications onto one of the example deployment environments 112. As illustrated in FIG. 1, the example application director 106 includes a topology generator 120, a deployment plan generator 122, and a deployment director 124.

The example topology generator 120 generates a basic blueprint 126 that specifies a logical topology of an application to be deployed. The example basic blueprint 126 generally captures the structure of an application as a collection of application components executing on virtual computing resources. For example, the basic blueprint 126 generated by the example topology generator 120 for an online store application may specify a web application (e.g., in the form of a Java web application archive or "WAR" file including dynamic web pages, static web pages, Java servlets, Java classes, and/or other property, configuration and/or resources files that make up a Java web application) executing on an application server (e.g., Apache Tomcat application server) that uses a database (e.g., MongoDB) as a data store. As used herein, the term "application" generally refers to a logical deployment unit, including one or more application packages and their dependent middleware and/or operating systems. Applications may be distributed across multiple VMs. Thus, in the example described above, the term "application" refers to the entire online store application, including application server and database components, rather than just the web application itself In some instances, the application may include the underlying hardware and/or virtual computing hardware utilized to implement the components.

The example basic blueprint 126 of FIG. 1 may be assembled from items (e.g., templates) from a catalog 130, which is a listing of available virtual computing resources (e.g., VMs, networking, storage, etc.) that may be provisioned from the cloud computing platform provider 110 and available application components (e.g., software services, scripts, code components, application-specific packages) that may be installed on the provisioned virtual computing resources. The example catalog 130 may be pre-populated and/or customized by an administrator 116 (e.g., IT (Information Technology) or system administrator) that enters in specifications, configurations, properties, and/or other details about items in the catalog 130. Based on the application, the example blueprints 126 may define one or more dependencies between application components to indicate an installation order of the application components during deployment. For example, since a load balancer usually cannot be configured until a web application is up and running, the developer 118 may specify a dependency from an Apache service to an application code package.

The example deployment plan generator 122 of the example application director 106 of FIG. 1 generates a deployment plan 128 based on the basic blueprint 126 that includes deployment settings for the basic blueprint 126 (e.g., virtual computing resources' cluster size, CPU, memory, networks, etc.) and an execution plan of tasks having a specified order in which virtual computing resources are provisioned and application components are installed, configured, and started. The example deployment plan 128 of FIG. 1 provides an IT administrator with a process-oriented view of the basic blueprint 126 that indicates discrete actions to be performed to deploy the application. Different deployment plans 128 may be generated from a single basic blueprint 126 to test prototypes (e.g., new application versions), to scale up and/or scale down deployments, and/or to deploy the application to different deployment environments 112 (e.g., testing, staging, production). The deployment plan 128 is separated and distributed as local deployment plans having a series of tasks to be executed by the VMs 114 provisioned from the deployment environment 112. Each VM 114 coordinates execution of each task with a centralized deployment module (e.g., the deployment director 124) to ensure that tasks are executed in an order that complies with dependencies specified in the application blueprint 126.

The example deployment director 124 of FIG. 1 executes the deployment plan 128 by communicating with the cloud computing platform provider 110 via a cloud interface 132 to provision and configure the VMs 114 in the deployment environment 112. The example cloud interface 132 of FIG. 1 provides a communication abstraction layer by which the application director 106 may communicate with a heterogeneous mixture of cloud provider 110 and deployment environments 112. The deployment director 124 provides each VM 114 with a series of tasks specific to the receiving VM 114 (herein referred to as a "local deployment plan"). Tasks are executed by the VMs 114 to install, configure, and/or start one or more application components. For example, a task may be a script that, when executed by a VM 114, causes the VM 114 to retrieve and install particular software packages from a central package repository 134. The example deployment director 124 coordinates with the VMs 114 to execute the tasks in an order that observes installation dependencies between VMs 114 according to the deployment plan 128. After the application has been deployed, the application director 106 may be utilized to monitor and/or modify (e.g., scale) the deployment.

The example cloud manager 138 of FIG. 1 interacts with the components of the system 100 (e.g., the application director 106 and the cloud provider 110) to facilitate the management of the resources of the cloud provider 110. The example cloud manager 138 includes a blueprint manager 140 to facilitate the creation and management of multi-machine blueprints and a resource manager 144 to reclaim unused cloud resources. The cloud manager 138 may additionally include other components for managing a cloud environment.

The example blueprint manager 140 of the illustrated example manages the creation of multi-machine blueprints that define the attributes of multiple virtual machines as a single group that can be provisioned, deployed, managed, etc. as a single unit. For example, a multi-machine blueprint may include definitions for multiple basic blueprints that make up a service (e.g., an e-commerce provider that includes web servers, application servers, and database servers). A basic blueprint is a definition of policies (e.g., hardware policies, security policies, network policies, etc.) for a single machine (e.g., a single virtual machine such as a web server virtual machine and/or container). Accordingly, the blueprint manager 140 facilitates more efficient management of multiple virtual machines and/or containers than manually managing (e.g., deploying) basic blueprints individually. Example management of multi-machine blueprints is described in further detail in conjunction with FIG. 2.

The example blueprint manager 140 of FIG. 1 additionally annotates basic blueprints and/or multi-machine blueprints to control how workflows associated with the basic blueprints and/or multi-machine blueprints are executed. As used herein, a workflow is a series of actions and decisions to be executed in a virtual computing platform. The example system 100 includes first and second distributed execution manager(s) (DEM(s)) 146A and 146B to execute workflows. According to the illustrated example, the first DEM 146A includes a first set of characteristics and is physically located at a first location 148A. The second DEM 146B includes a second set of characteristics and is physically located at a second location 148B. The location and characteristics of a DEM may make that DEM more suitable for performing certain workflows. For example, a DEM may include hardware particularly suited for performance of certain tasks (e.g., high-end calculations), may be located in a desired area (e.g., for compliance with local laws that require certain operations to be physically performed within a country's boundaries), may specify a location or distance to other DEMS for selecting a nearby DEM (e.g., for reducing data transmission latency), etc. Thus, the example blueprint manager 140 annotates basic blueprints and/or multi-machine blueprints with capabilities that can be performed by a DEM that is labeled with the same or similar capabilities.

The resource manager 144 of the illustrated example facilitates recovery of cloud computing resources of the cloud provider 110 that are no longer being activity utilized. Automated reclamation may include identification, verification and/or reclamation of unused, underutilized, etc. resources to improve the efficiency of the running cloud infrastructure.

Figure 2:
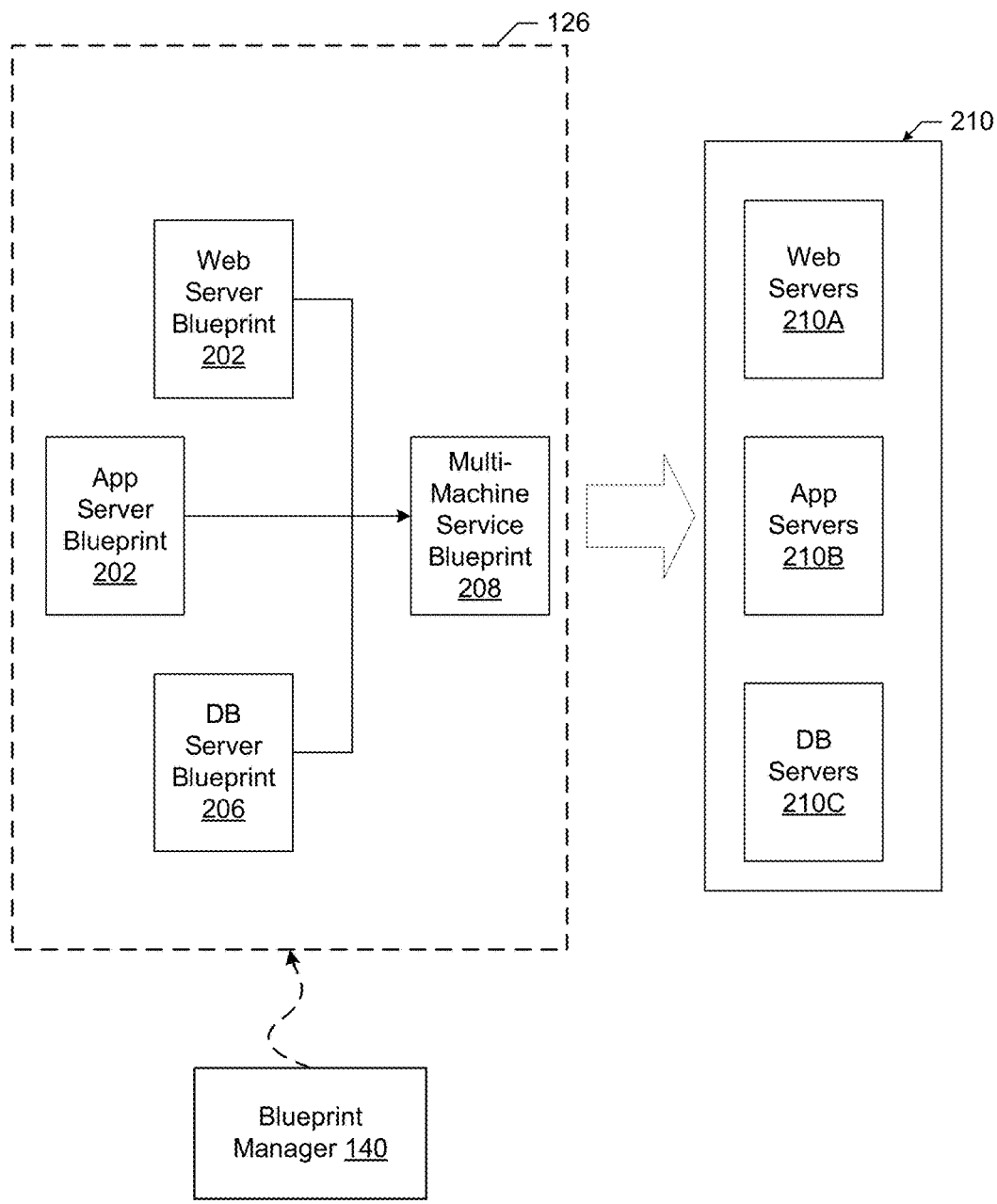
FIG. 2 illustrates an example generation of a multi-machine blueprint by the example blueprint manager of FIG. 1.

FIG. 2 illustrates an example implementation of the blueprint 126 as a multi-machine blueprint generated by the example blueprint manager 140 of FIG. 1. In the illustrated example of FIG. 2, three example basic blueprints (a web server blueprint 202, an application server blueprint 204, and a database (DB) server blueprint 206) have been created (e.g., by the topology generator 120). For example, the web server blueprint 202, the application server blueprint 204, and the database server blueprint 206 may define the components of an e-commerce online store.

The example blueprint manager 140 provides a user interface for a user of the blueprint manager 140 (e.g., the administrator 116, the developer 118, etc.) to specify blueprints (e.g., basic blueprints and/or multi-machine blueprints) to be assigned to an instance of a multi-machine blueprint 208. For example, the user interface may include a list of previously generated basic blueprints (e.g., the web server blueprint 202, the application server blueprint 204, the database server blueprint 206, etc.) to allow selection of desired blueprints. The blueprint manager 140 combines the selected blueprints into the definition of the multi-machine blueprint 208 and stores information about the blueprints in a multi-machine blueprint record defining the multi-machine blueprint 208. The blueprint manager 140 may additionally include a user interface to specify other characteristics corresponding to the multi-machine blueprint 208. For example, a creator of the multi-machine blueprint 208 may specify a minimum number and a maximum number of each blueprint component of the multi-machine blueprint 208 that may be provisioned during provisioning of the multi-machine blueprint 208.

Accordingly, any number of virtual machines (e.g., the virtual machines associated with the blueprints in the multi-machine blueprint 208) and/or containers may be managed collectively. For example, the multiple virtual machines corresponding to the multi-machine blueprint 208 may be provisioned based on an instruction to provision the multi-machine blueprint 208, may be power cycled by an instruction, may be shut down by an instruction, may be booted by an instruction, etc. As illustrated in FIG. 2, an instruction to provision the multi-machine blueprint 208 may result in the provisioning of a multi-machine service formed from one or more VMs 114 that includes virtualized web server(s) 210A, virtualized application server(s) 210B, and virtualized database server(s) 210C. The number of virtual machines and/or containers provisioned for each blueprint may be specified during the provisioning of the multi-machine blueprint 208 (e.g., subject to the limits specified during creation or management of the multi-machine blueprint 208).

The multi-machine blueprint 208 maintains the reference to the basic blueprints 202, 204, 206. Accordingly, changes made to the blueprints (e.g., by a manager of the blueprints different than the manager of the multi-machine blueprint 208) may be incorporated into future provisioning of the multi-machine blueprint 208. Accordingly, an administrator maintaining the source blueprints (e.g., an administrator charged with managing the web server blueprint 202) may change or update the source blueprint and the changes may be automatically propagated to the machines provisioned from the multi-machine blueprint 208. For example, if an operating system update is applied to a disk image referenced by the web server blueprint 202 (e.g., a disk image embodying the primary disk of the web server blueprint 202), the updated disk image is utilized when deploying the multi-machine blueprint. Additionally, the blueprints may specify that the machines 210A, 210B, 210C of the multi-machine service 210 provisioned from the multi-machine blueprint 208 operate in different environments. For example, some components may be physical machines, some may be on-premise virtual machines, and some may be virtual machines at a cloud service.

Several multi-machine blueprints may be generated to provide one or more varied or customized services. For example, if virtual machines deployed in the various States of the United States require different settings, a multi-machine blueprint could be generated for each state. The multi-machine blueprints could reference the same build profile and/or disk image, but may include different settings specific to each state. For example, the deployment workflow may include an operation to set a locality setting of an operating system to identify a particular state in which a resource is physically located. Thus, a single disk image may be utilized for multiple multi-machine blueprints reducing the amount of storage space for storing disk images compared with storing a disk image for each customized setting.

Figure 3:
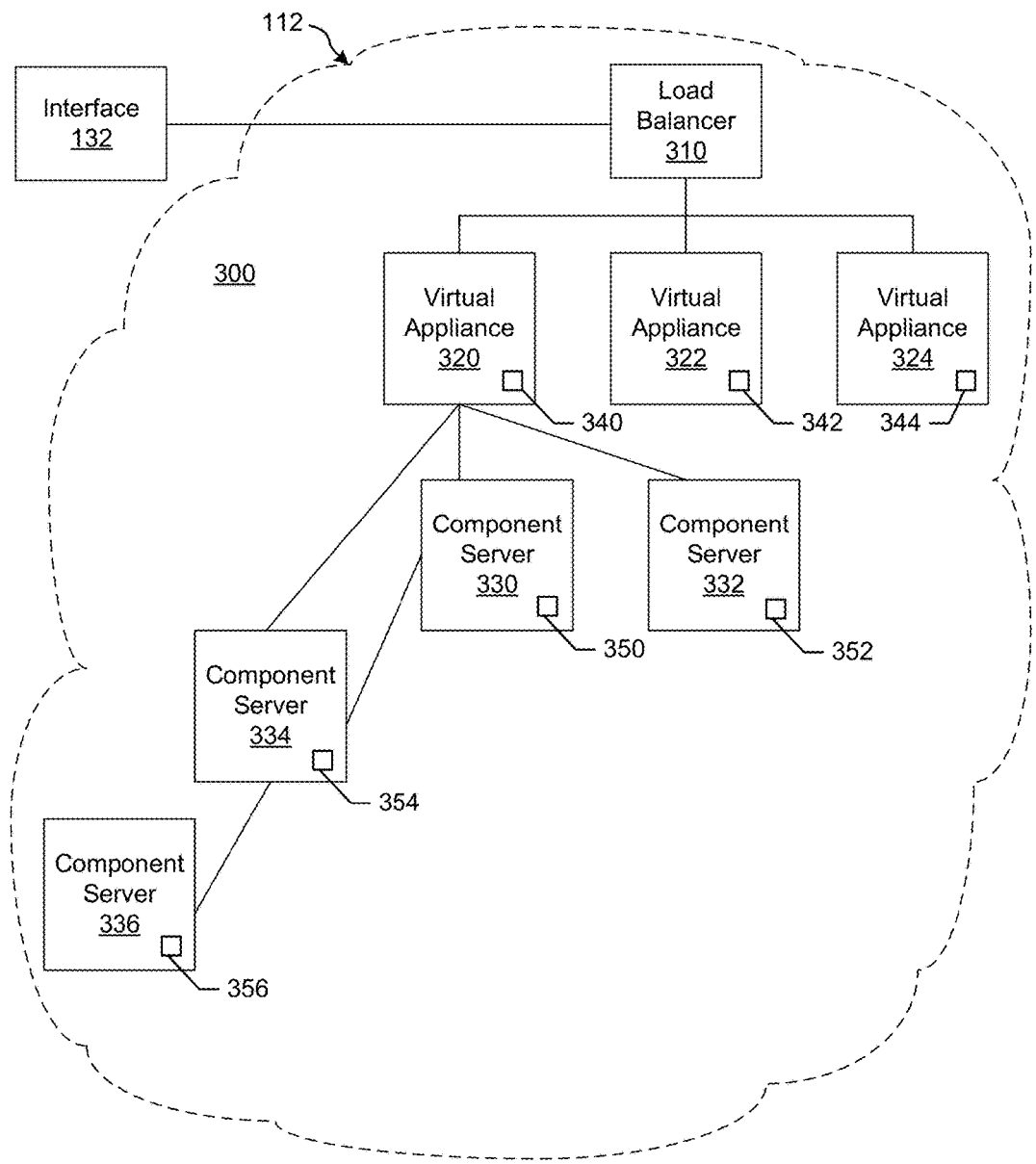
FIG. 3 illustrates an example installation of deployed virtual machines and associated servers acting as hosts for deployment of component servers for a customer.

FIG. 3 illustrates an example installation of deployed appliances or virtual appliances (vAs) (e.g., VMs 114 and/or containers 114a) and associated virtualized servers acting as hosts for deployment of component servers (e.g., Web server, application server, database server, etc.) for a customer. The vAs can be deployed as an automation tool, for example, used to deliver VMs and associated applications for on-premise automation and/or handling of external cloud resources (e.g., Microsoft Azure™, Amazon Web Services™, etc.).

As shown in the example of FIG. 3, an installation 300 includes a load balancer (LB) 310 to assign tasks and/or manage access among a plurality of vAs 320, 322, 324. Each vA 320-324 is a deployed VM 114 and/or container 114a. In this example, the vA 320 communicates with a plurality of component or host servers 330, 332, 334, 336 which store components for execution by users (e.g., Web server 210A with Web components, App server 210B with application components, DB server 210C with database components, etc.). As shown in the example of FIG. 3, component servers 334, 336 can stem from component server 330 rather than (or in addition to) directly from the virtual appliance 320, although the vA 320 can still communicate with such servers 334, 336. The LB 310 enables the multiple vAs 320-324 and multiple servers 330-336 to appear as one device to a user. Access to functionality can then be distributed among appliances 320-324 by the LB 310 and among servers 330-336 by the respective appliance 320, for example. The LB 310 can use least response time, round-robin, and/or other method to balance traffic to vAs 320-324 and servers 330-336, for example.

In the example installation 300, each vA 320, 322, 324 includes a management endpoint 340, 342, 344. Each component server 330, 332, 334, 336 includes a management agent 350, 352, 354, 356. The management agents 350-356 can communicate with their respective endpoint 340 to facilitate transfer of data, execution of tasks, etc., for example.

In certain examples, the management agents 350-356 synchronize component servers 330-336 with the vA 320-234 and facilitate host access and associated services (e.g., hostd, ntpd, sfcbd, slpd, wsman, vobd, etc.). The management agents 350-356 can communicate with their respective endpoint 340 to facilitate transfer of data, execution of tasks, etc., for example. The relationship between management endpoint 340, 342, 344 and associated management agents 350, 352, 354, 356 can be used to deploy and install software on multiple component machines 330, 332, 334, 336.

In certain examples, a graphical user interface associated with a front end of the load balancer 310 guides a customer through one or more questions to determine system requirements for the installation 300. Once the customer has completed the questionnaire and provided firewall access to install the agents 350-356, the agents 350-356 communicate with the endpoint 340 without customer involvement. Thus, for example, if a new employee needs a Microsoft Windows® machine, a manager selects an option (e.g., clicks a button, etc.) via the graphical user interface to install a VM 114 and/or container 114a that is managed through the installation 300. To the user, he or she is working on a single machine, but behind the scenes, the virtual appliance (vA) 320 is accessing different servers 330-336 depending upon what functionality is to be executed.

In certain examples agents 350-356 are deployed in a same data center as the endpoint 340 to which the agents 350-356 are associated. The deployment can include a plurality of agent servers 330-336 distributed worldwide, and the deployment can be scalable to accommodate additional server(s) with agent(s) to increase throughput and concurrency, for example.

Figure 4:
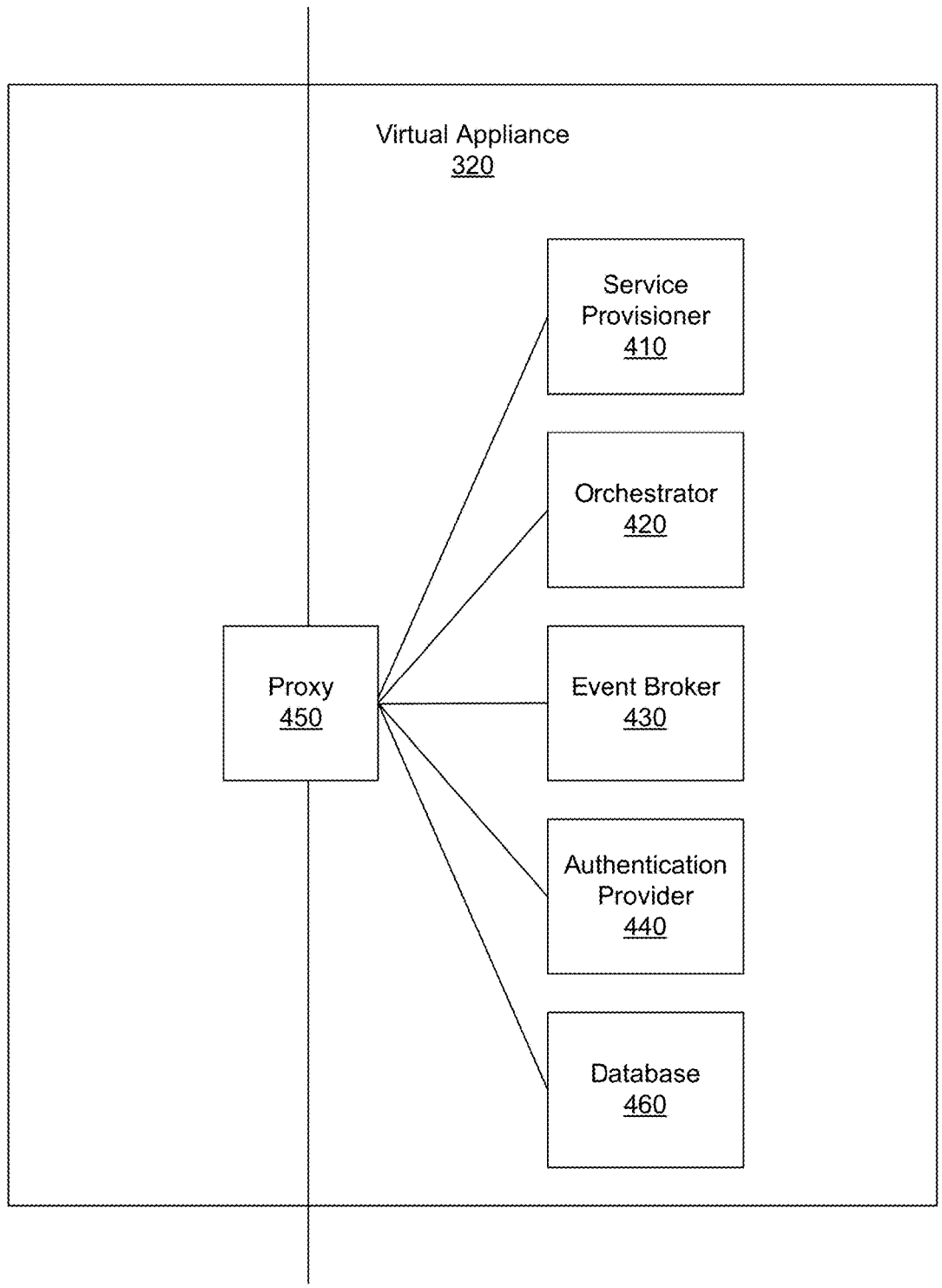
FIG. 4 illustrates an example implementation of a virtual appliance.

FIG. 4 illustrates an example implementation of the vA 320. In the example of FIG. 4, the vA 320 includes a service provisioner 410, an orchestrator 420, an event broker 430, an authentication provider 440, an internal reverse proxy 450, and a database 460. The components 410, 420, 430, 440, 450, 460 of the vA 320 may be implemented by one or more of the VMs 114. The example service provisioner 410 provides services to provision interfaces (e.g., Web interface, application interface, etc.) for the vA 320. The example orchestrator (e.g., vCO) 420 is an embedded or internal orchestrator that can leverage a provisioning manager, such as the application director 106 and/or cloud manager 138, to provision VM services but is embedded in the vA 320. For example, the vCO 420 can be used to invoke a blueprint to provision a manager for services.

Example services can include catalog services, identity services, component registry services, event broker services, IaaS, XaaS, etc. Catalog services provide a user interface via which a user can request provisioning of different preset environments (e.g., a VM including an operating system and software and some customization, etc.), for example. Identity services facilitate authentication and authorization of users and assigned roles, for example. The component registry maintains information corresponding to installed and deployed services (e.g., uniform resource locators for services installed in a VM/vA, etc.), for example. The event broker provides a messaging broker for event-based communication, for example. The IaaS provisions one or more VMs and/or containers for a customer via the vA 320. The XaaS can extend the provisioning to also request, approve, provision, operate, and decommission any type of catalog items (e.g., storage, applications, accounts, and anything else that the catalog provides as a service).

The example event broker 430 provides a mechanism to handle tasks which are transferred between services with the orchestrator 420. The example authentication provider 440 (e.g., VMware Horizon™ services, etc.) authenticates access to services and data, for example.

The components of the vA 320 access each other through REST API calls behind the internal reverse proxy 450 (e.g., a high availability (HA) proxy HAProxy) which provides a high availability load balancer and proxy for Transmission Control Protocol (TCP)- and Hypertext Transfer Protocol (HTTP)-based application requests. In this example, the proxy 450 forwards communication traffic from within the vA 320 and/or between vAs 320, 322, 324 of FIG. 3 to the appropriate component(s) of the vA 320. In certain examples, services access the local host/proxy 450 on a particular port, and the call is masked by the proxy 450 and forwarded to the particular component of the vA 320. Since the call is masked by the proxy 450, components can be adjusted within the vA 320 without impacting outside users.

Example Cloning

In certain examples, as described above, each vA 320, 322, 324 includes a management endpoint 340, 342, 344, and each component server 330, 332, 334, 336 includes a management agent 350, 352, 354, 356. The management agents 350-356 synchronize component servers 330-336 with the vA 320-234 and facilitate host access and associated services (e.g., hostd, ntpd, sfcbd, slpd, wsman, vobd, etc.). The management agents 350-356 can communicate with their respective endpoint 340 to facilitate transfer of data, execution of tasks, etc., for example. The relationship between management endpoint 340, 342, 344 and associated management agents 350, 352, 354, 356 can be used to deploy and install software on multiple component machines 330, 332, 334, 336. In certain examples, installation of software, such as a management agent, on multiple machines (e.g., ten Microsoft Windows™ machines, etc.), can be facilitated by installing software on one machine 330 and then cloning that machine 330 for the reminder of the installation to eliminate manual installation on the other machines 334, 336.

A clone is a copy of an existing virtual machine (e.g., component server 330). The existing virtual machine is called the parent of the clone. When the cloning operation is complete, the clone is a separate virtual machine (although the clone may share virtual disks with the parent virtual machine, for example). Changes made to a clone do not affect the parent virtual machine. Changes made to the parent virtual machine do not appear in a clone. A clone's media access control (MAC) address and identifier are different from those of the parent virtual machine.

Installing an operating system and applications can be time consuming. With clones, a user can make many copies of a virtual machine from a single installation and configuration process. Clones are useful, for example, when many identical virtual machines are to be deployed in a group. For example, a company, department, etc., can clone a virtual machine for each employee, with a suite of preconfigured office applications. A virtual machine can be configured with a complete development environment and then cloned repeatedly as a baseline configuration for software testing, for example. A teacher can clone a virtual machine for each student, with all the lessons and labs required for the term loaded on each cloned machine. With clones, complete copies of a virtual machine can be conveniently made without browsing a host file system or worrying if all configuration files have been located.

Clones can be full clones or linked clones, for example. A full clone is an independent copy of a virtual machine that shares nothing with the parent virtual machine after the cloning operation. Ongoing operation of a full clone is entirely separate from the parent virtual machine. A linked clone is a copy of a virtual machine that shares virtual disks with the parent virtual machine in an ongoing manner. Sharing conserves disk space and allows multiple virtual machines to use the same software installation, for example.

A full clone is an independent virtual machine with no need to access the parent. Full clones do not require an ongoing connection to the parent virtual machine. Because a full clone does not share virtual disks with the parent virtual machine, full clones generally perform better than linked clones. However, full clones take longer to create than linked clones. Creating a full clone can take several minutes if the files involved are large.

A linked clone is made from a snapshot of the parent. A snapshot captures an entire state of a virtual machine at the time the snapshot is taken. A snapshot can include contents of the virtual machine's memory, virtual machine settings, state of the virtual machines' disks, etc. Files available on the parent at the moment of the snapshot continue to remain available to the linked clone. Ongoing changes to the virtual disk of the parent do not affect the linked clone, and changes to the disk of the linked clone do not affect the parent.

A linked clone must have access to the parent. Without access to the parent, a linked clone is disabled. Linked clones are created swiftly, so a unique virtual machine can be easily created for each task to be done. A virtual machine can be easily shared with other users by storing the virtual machine on a local network, where other users can quickly make a linked clone. This facilitates collaboration: for example, a support team can reproduce a bug in a virtual machine, and an engineer can quickly make a linked clone of that virtual machine to work on the bug.

A full clone is a complete and independent copy of a virtual machine. However, the full clone duplicates only the state of the virtual machine at the instant of the cloning operation. Thus, the full clone does not have access to any snapshots that may exist of the parent virtual machine.

In more detail, a cloud-based installation may include one or more vAs 320-324 and one or more servers 330-336 (e.g., "Windows™ machines", etc.) on which a plurality of components (e.g., five, six, seven, ten, etc.) are installed (e.g., applications, database, management, etc.) to form an IaaS in a distributed, high availability environment. The management agents 350-356 communicate with the management endpoint(s) 340-344 to receive commands, execute commands, install software, upgrade an installation at the server 330-336, etc.

Each management agent 350-356 has a node identifier (ID) that uniquely identifies the agent 350-356 in a cluster of machines 330-336 forming the system 300. When installing the agent 350-356, an address and root credentials of the primary vA 320 are entered so that the agent 350-356 can register itself in the vA 320. After the registration, communication with the vA 320 is authenticated using a self-signed certificate. Since the self-signed certificate is used for communication between the agent 350-356 and the endpoint 340, the root credentials of the vA 320 are not persisted on the machines 330-336. Having to manually install an agent 350-356 on all component machines 330-336 is a slow process requiring multiple context switches (e.g., logging into each machine 330-336) for a user. Simplifying this process reduces the time needed to set up a new instance of the system 300 (e.g., the vRA system, etc.).

Certain examples allow a user to install software on a first component server 330, which then clones the installation on a plurality of component servers 334, 336 to eliminate manual installation on the machines 334, 336. Rather than requiring registration and authentication of the user based on username and password, the component server 330 can be cloned and the information of the parent machine 330 becomes the information of the cloned server 334, 336. Initially, each clone 334, 336 presents as the same device as the first component server 330. However, each management agent 354, 356 knows that it is a clone and provides its own instance of the component server 330 and management agent 350. For example, if the component server 330 is instance 1, then the first clone 334 is instance 1*. The clone management agent 354 communicates with the primary management agent 350, and the cloned server 334 becomes instance 2. Thus, a first installed server 330 can be cloned N times to generate installed machines 334, 336 for a customer's system 300 deployment.

More specifically, when the customer installs the first instance of the management agent 350, the agent 350 is registered in the vA 320. The agent 350 also registers its self-signed certificate that can be used to authenticate to the vA 320 after the self-signed certificate is registered. The agent 350 also stores an identifier (e.g., a system management basic input/output system (SMBIOS) universally unique identifier (UUID), globally unique identifier (GUID), etc.) associated with the component server 330 in a configuration file for the agent 350. When the machine 330 is cloned, an identifier (e.g., its SMBIOS UUID, GUID, etc.) is changed from the identifier of the server 330 to generate a new identifier for the cloned server 334, 336 (e.g., a new UUID, GUID, etc.). A clone 334, 336 can be identified based on an analysis of whether the identifier for a server 334, 336 is unique or matches another server 330 when initially evaluated, for example.

On startup of a service associated with the agent 350-356, the agent 350-356 checks whether the identifier (e.g., SMBIOS UUID, GUID, etc.) associated with its server 330-336 is the same as the identifier recorded in its configuration file. If the identifiers match, then the server 330, 332 is not a cloned server. If the identifiers do not match, then the servers 334, 336 are cloned servers, and their agents 354, 356 begin a procedure to register the clone 334, 336 with the vA 320. A new node identifier and a new self-signed certificate are generated for each cloned agent 354, 356. Using the old certificate and old node identifier present on the cloned server 334, 336 from the original server 330 (trusted by the vA 320), the cloned agents 354, 356 each register themselves with the vA 320 using the new node identifier and self-signed certificate. Upon successful registration, the old node identifier and old certificate are removed from the cloned servers 334, 336, and the new identifier is stored in the configuration file for each server 334, 336.

Thus, cloned machines 334, 336 can be identified and initially distinguished from other installed machines 330, 332. Cloned machines 334, 336 can be registered with the vA 320 without storing the vA's 320 root credential (and without asking the user to provide the vA's 320 root credentials). Each agent 354, 356 is associated with a unique node identifier even though the agents 354, 356 are cloned from the same source template.

Figure 5A:
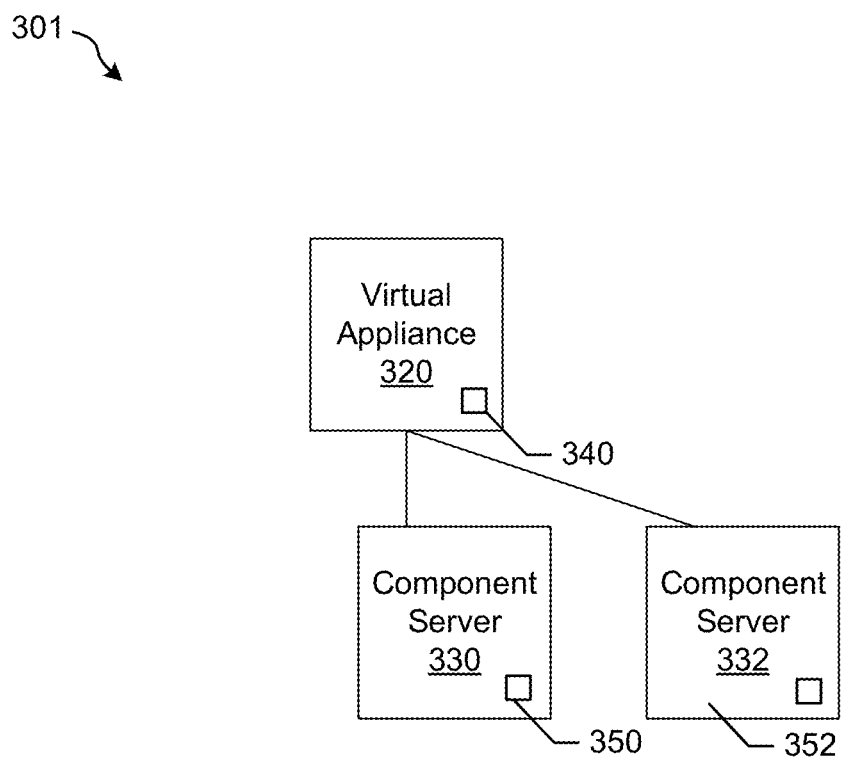
FIGS. 5A-5C illustrate an example cloning and configuration sequence for the example installation of FIG. 3.
Figure 5B:
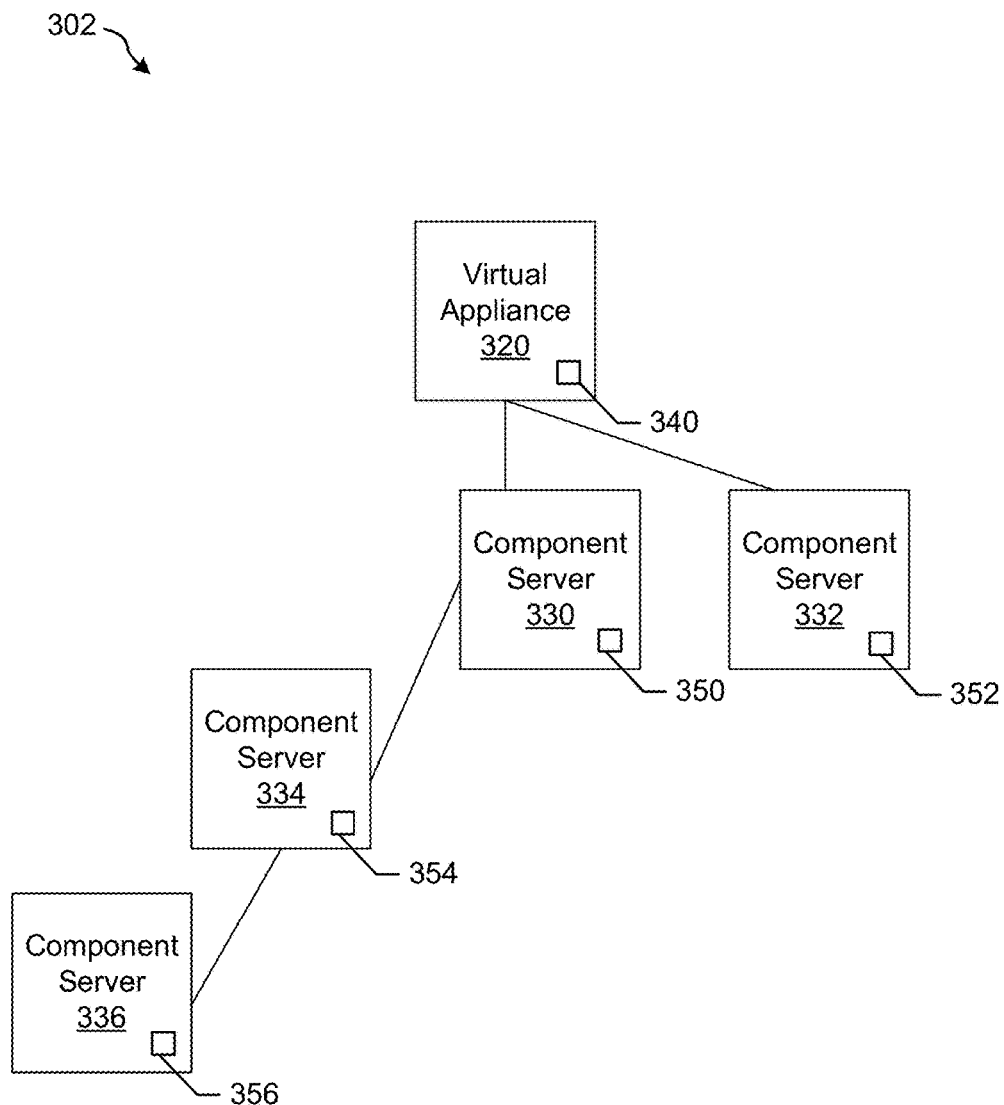
Figure 5C:
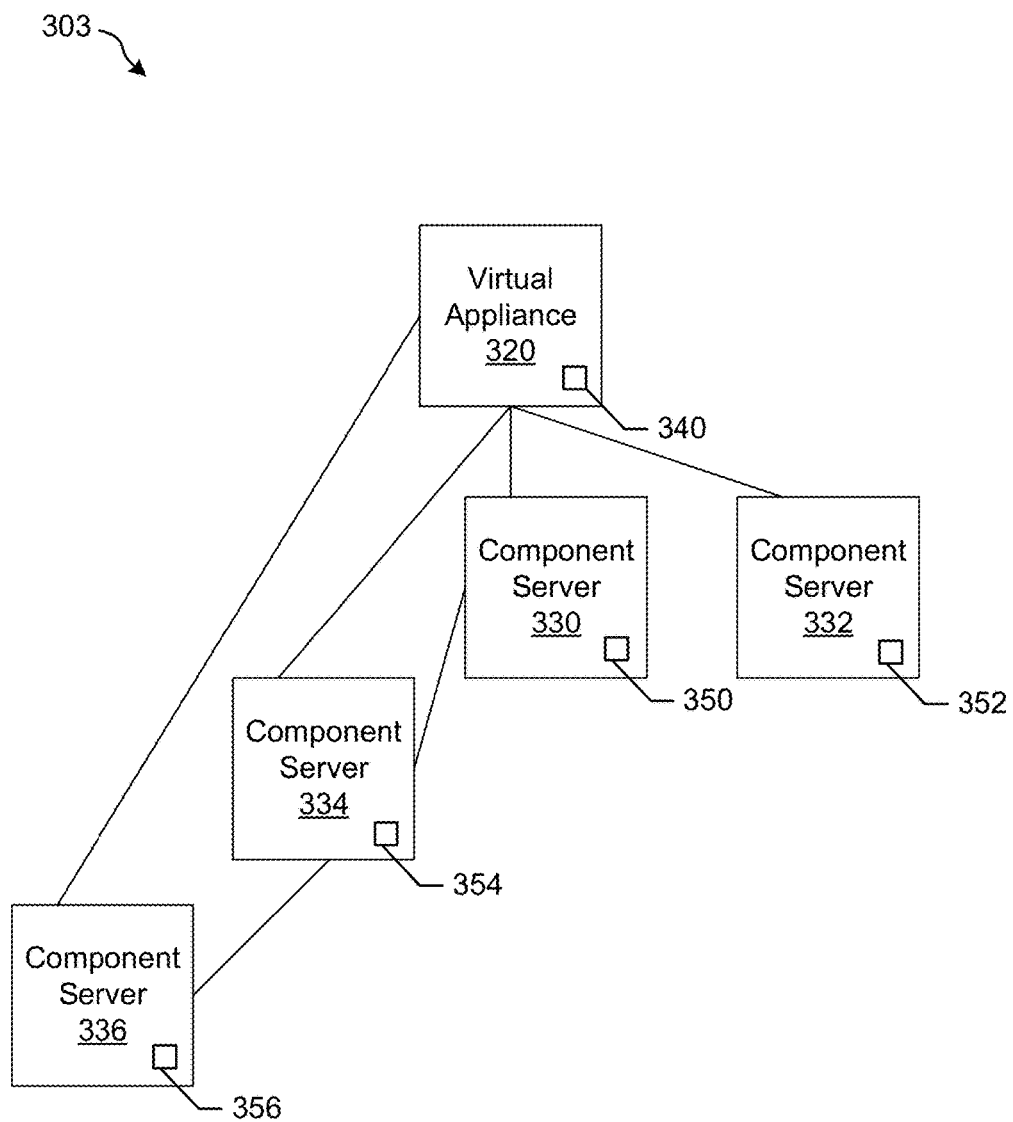

FIGS. 5A-5C illustrate an example cloning and configuration sequence for the example installation 300. As shown in the example of FIG. 5A, component servers 330, 332 are installed with respect to the vA 320. As shown in the example of FIG. 5B, the component server 330 is cloned to produce component servers 334, 336. The component servers 334, 336 and their management agents 354, 356 are identical to the sever 330 and its management agent 350 and communicate with the agent 350 of the server 330. FIG. 5C shows the example installation 300 after the cloned servers 334, 336 been initialized and set up as independent servers 334, 336 apart from the cloned server 330. The servers 334, 336 and their management agents 354, 356 can then communicate with the vA 320 directly, rather than through the server 330, for example.

Figure 6:
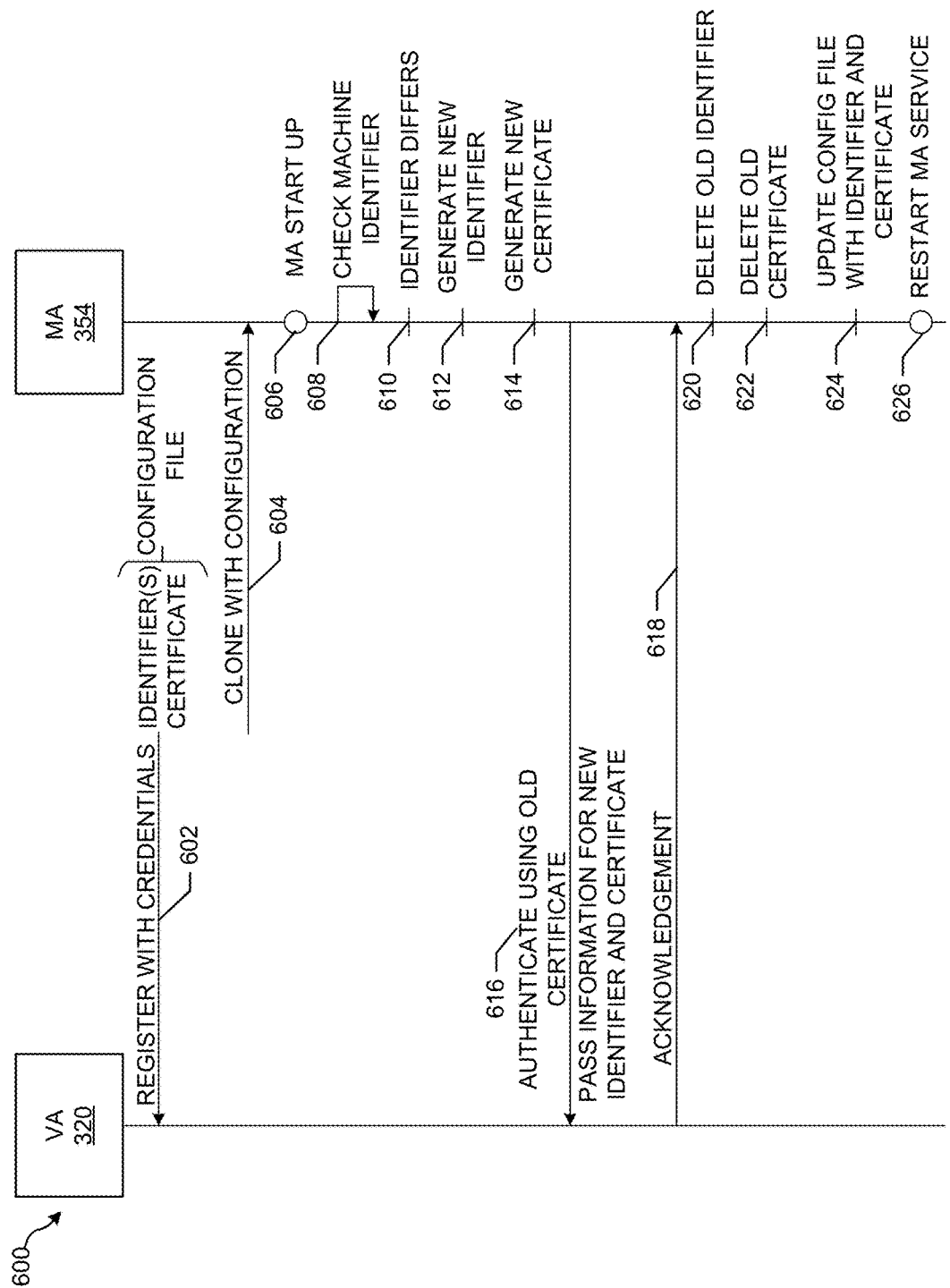
FIG. 6 illustrates an example data flow diagram showing an exchange of information between components of the example installation of FIG. 3.

FIG. 6 illustrates an example data flow diagram showing an exchange of information 600 between the vA 320 and the management agents 350, 354. The vA 320 serves as a primary appliance, and the server 330 (e.g., a Microsoft Windows™ server, etc.) has the management agent 350. When the management agent 350 is installed on the server 330, an identifier is generated with which the agent 350 presents itself to the vA 320 (e.g., a 32-digit unique identifier such as a GUID, etc.). The agent 350 generates the identifier and binds a certificate associated with the server 330 to the identifier.

In the example of FIG. 6, at 602, the management agent 350 registers with the vA 320 using credentials. The credentials can be obtained from a configuration file associated with the management agent 350, which includes identifier(s) for the agent 350 and/or its server 330, a certificate for the server 330, etc. The management agent 350 presents the identifier and public key of the certificate for the server 330 to the vA 320 so that further communication between the agent 350 and vA 320 is authenticated using the certificate. The agent 350 can then operate in conjunction with the endpoint 340 to execute tasks via the server 330. After registration, agent 350 does not store a vA 320 credential on the server 330 for security reasons, for example. Information regarding the server 330 and agent 350 (e.g., unique identifier(s), certificate, etc.) can persist in the configuration file stored on the server 330, for example.

At 604, the management agent 350 and its server 330 are cloned to produce the management agent 354 and its server 334. For example, the agent 350 uses the configuration file (e.g., including identifier(s), certificate, etc.) and credential information to spawn the server 334 and agent 354. The agent 354 and server 334 then match the agent 350 and server 330 until they are further configured. The cloned agent 354 receives a new machine identifier for the server 334 as part of the cloning process.

At 606, the cloned management agent 354 starts up (e.g., is initialized, begins execution, etc.). At 606, the management agent 354 does not realize whether or not it is a cloned agent. At 608, the management agent 354 checks its machine identifier. When the agent 354 starts, the agent 354 checks its configuration file including the stored value of a machine identifier and compares the identifier stored in the configuration file to the new machine identifier associated with the agent 354 and/or the server 334 in the cloning process. If the identifiers match, then the server 334 has not been cloned. However, if the identifiers do not match, 610, then the server 334 has been cloned. That is, the cloned server 334 is assigned its own machine identifier but has the identifier of the primary or cloned server 330 in its configuration file. Therefore, the identifier associated with the server 334 does not match the stored identifier in the configuration file. The agent 354 can then determine that the server 334 has been cloned. The difference in identifiers triggers the agent 354 to register with the vA 320.

When the clone registration process is triggered 610, the agent 354 generates a new identifier 612 and generates a new certificate 614 for the server 334 and agent 354 based on the new machine identifier.

Previously, server registration required role credentials of the appliance 320, which are not stored on the server 334 and then must be provided manually. However, in certain examples, the server 330 has been authenticated and registered, and trust has been exchanged between the server 330 and the vA 320 via the agent 350 using the certificate. At 610, the cloned agent 354 can use the server 330 certificate to communicate with the vA 320 without a username and password, which are not stored on the clone.

As shown in the example message and data flow 600, the new registration call 616 by the management agent 354 includes the certificate used by the agent 350 for the vA 320 and also provides the new identifier and new certificate that have been generated by the agent 354. The vA 320 receives the registration call 616 including the identifier and certificates and determines that a new node 334 exists with an identifier and certificate that can be trusted by the vA 320. At 618, the vA 320 responds with a status or acknowledgement indicating that the registration has been approved. The management agent 354 knows that it is a clone and also knows that it has now successfully registered with the appliance 320. The agent 354 no longer needs the old identifier and old certificate from the agent 350, so the identifier 620 and certificate 622 are deleted. By deleting the certificate and identifier, the agent 354 avoids a conflict with the agent 350, which continues to use the identifier and certificate. At 624, the agent 354 updates its configuration file with the new identifier(s) (e.g., machine identifier such as a GUID, UUID, etc.) and certificate for the server 334.

At 626, the management agent 354 service is restarted, and the agent 354 behaves as if the agent 354 and server 334 were newly installed. Thus, the process begins again at 608 to verify whether the associated machine identifier for the server 334 and the identifier stored in the agent's 354 configuration file are the same. Upon finding a match, the agent 354 and server 334 operate normally without trying to re-register. Communication with the vA 320 uses the new certificate and identifier for the agent 354 and server 334. As the agent 354 is configuring itself for communication with the vA 320 and proper identification, the agent 350 can be communicating with the vA 320, oblivious to the fact that the agent 350 was cloned to produce the agent 354. The vA 320 and its management endpoint 340 can then communicate distinctly with the agent 350 and/or agent 354 without confusing the two agents.

Thus, in certain examples, the vA 320 (e.g., via a data center through the orchestrator 420, etc.) can clone the server 330 to create the server 334, 336, etc. The management agent 350 is not aware of the cloning, and agents 354, 356 are only aware that the identifiers differ, thereby triggering the registration and certification process with the vA 320. The vA 320 handles such incoming requests and authenticates the agents 354, 356 and certificates to establish trusted communication between the endpoint 340 and agents 354, 356. Cloning enables a high availability (HA) environment to be set up quickly and easily in the example installation 300 with a primary or managing server 330 and a plurality of replica servers 334, 336.

Figure 7:
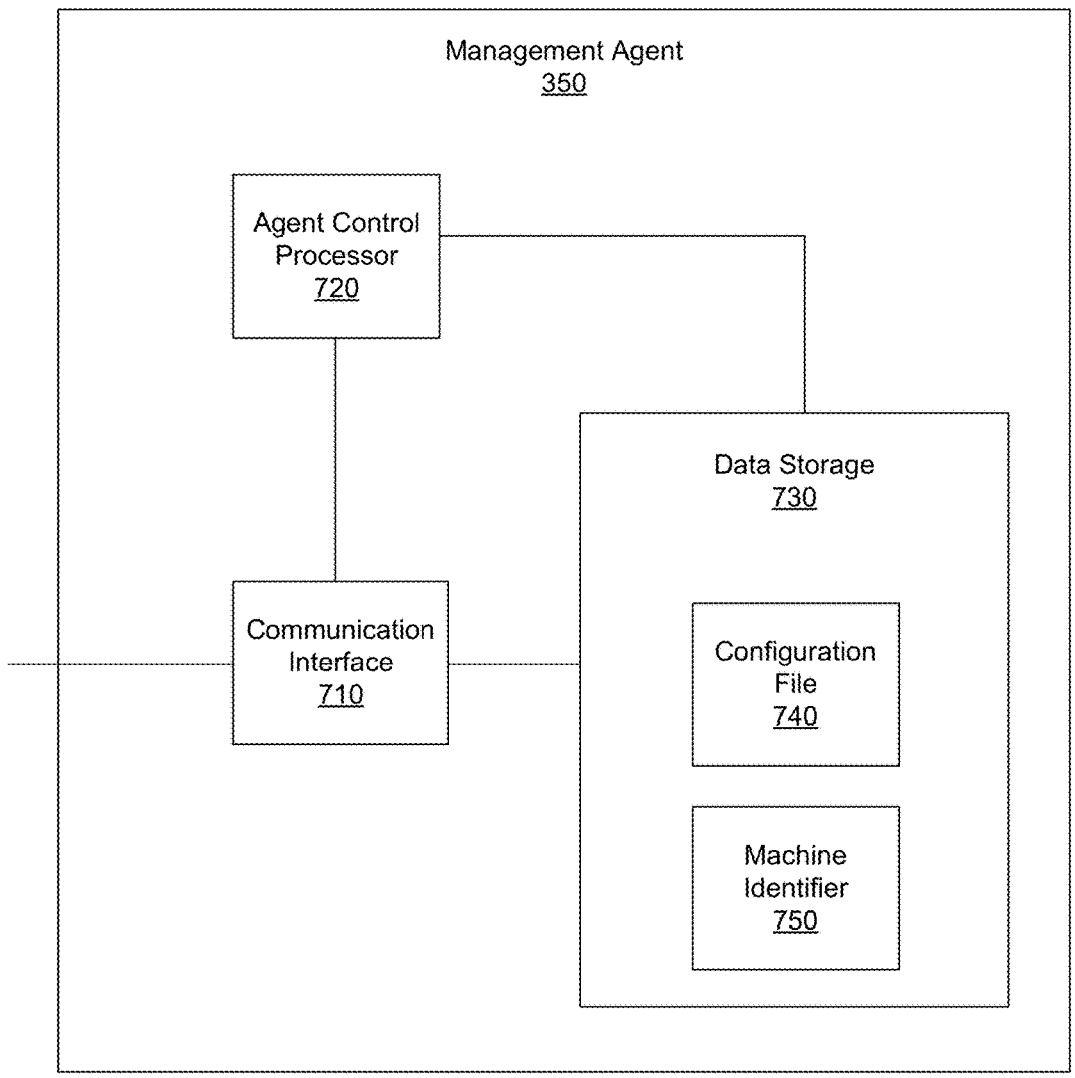
FIG. 7 illustrates an example implementation of a management agent.

FIG. 7 illustrates a block diagram of an example implementation of the management agent 350 (and/or 352, 354, 356). As shown in the example of FIG. 7, the management agent 350 includes a communication interface 710 through which the agent 350 can communicate with the endpoint 340 (and/or 342, 344) of the vA 320 (and/or 322, 324). The communication interface 710 is a hardware and/or software interface allowing the agent 350 to exchange data, commands, etc., with the endpoint 340 and/or other communication node, for example.

The example agent 350 also includes a processor 720. The process 720 executes instructions to control the agent 350 for command and/or other application execution, communication, storage, etc. The instructions can be transmitted to the processor 720 via the communication interface 710 and/or via a memory 730, for example.

The example memory 730 includes a configuration file 740 and a machine identifier 750. The example configuration file 740 can include information such as credentials to authenticate the agent 350 to the vA 320, etc. Credentials can include a certificate (e.g., with a public key and private key for authentication, etc.), a unique identifier, etc. The example processor 720 can compare the machine identifier 750 to the identifier stored in the configuration file 740, for example. The example memory 730 can also include instructions (e.g., computer program code, etc.) to be executed by the processor 720.

While example implementations of the example cloud computing system 100 and virtual machine installation 300 are illustrated in FIGS. 1-7, one or more of the elements, processes and/or devices illustrated in FIGS. 1-7 may be combined, divided, re-arranged, omitted, eliminated and/or implemented in any other way. Further, the example application director 106, example cloud provider 110, example cloud manager 138, example distributed execution managers 146A, 146B, example multi-machine service 210, example load balancer 310, example virtual appliances 320-324, example component servers 330-336, example management endpoints 340-344, example management agents 350-356, and/or, more generally, the example systems 100 and/or 300 of FIGS. 1-7 can be implemented by hardware, software, firmware and/or any combination of hardware, software and/or firmware. Thus, for example, any of the example application director 106, example cloud provider 110, example cloud manager 138, example distributed execution managers 146A, 146B, example multi-machine service 210, example load balancer 310, example virtual appliances 320-324, example component servers 330-336, example management endpoints 340-344, example management agents 350-356, and/or, more generally, the example systems 100 and/or 300 of FIGS. 1-7 can be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example application director 106, example cloud provider 110, example cloud manager 138, example distributed execution managers 146A, 146B, example multi-machine service 210, example load balancer 310, example virtual appliances 320-324, example component servers 330-336, example management endpoints 340-344, example management agents 350-356, and/or, more generally, the example systems 100 and/or 300 of FIGS. 1-7 is/are hereby expressly defined to include a tangible computer readable storage device or storage disk such as a memory, a digital versatile disk (DVD), a compact disk (CD), a Blu-ray disk, etc. storing the software and/or firmware. Further still, the example application director 106, example cloud provider 110, example cloud manager 138, example distributed execution managers 146A, 146B, example multi-machine service 210, example load balancer 310, example virtual appliances 320-324, example component servers 330-336, example management endpoints 340-344, example management agents 350-356, and/or, more generally, the example systems 100 and/or 300 of FIGS. 1-7 may include one or more elements, processes and/or devices in addition to, or instead of, those illustrated in FIGS. 1-7, and/or may include more than one of any or all of the illustrated elements, processes and devices.

Figure 8:
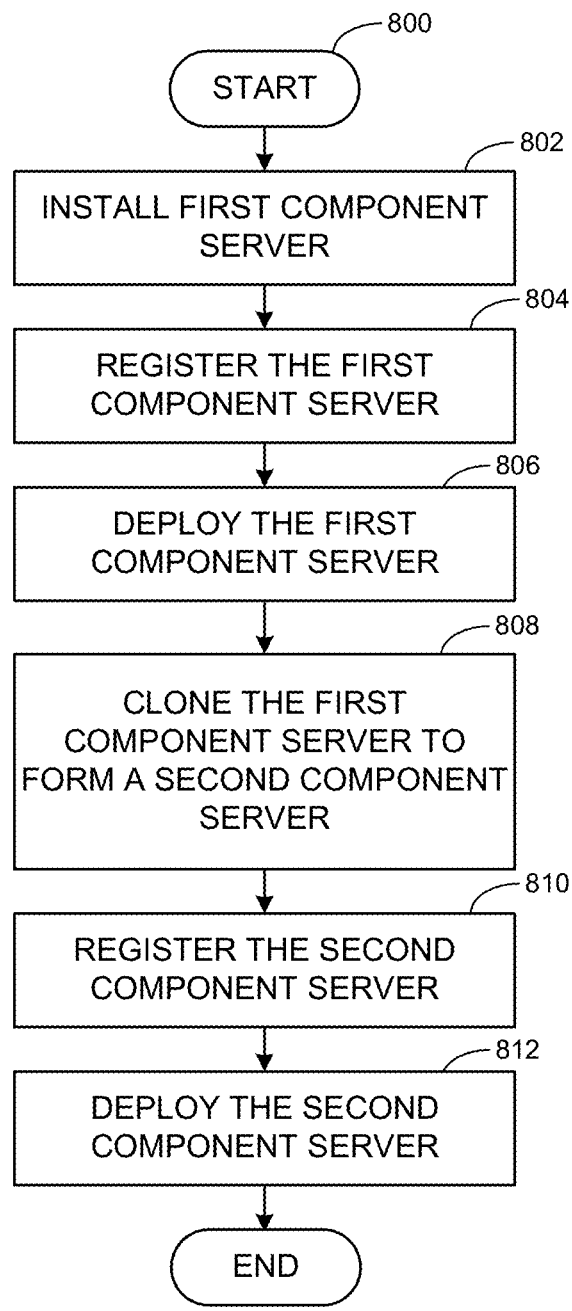
FIGS. 8-9 depict a flowcharts representative of computer readable instructions that may be executed to implement the example installation and deployment of component servers.
Figure 9:
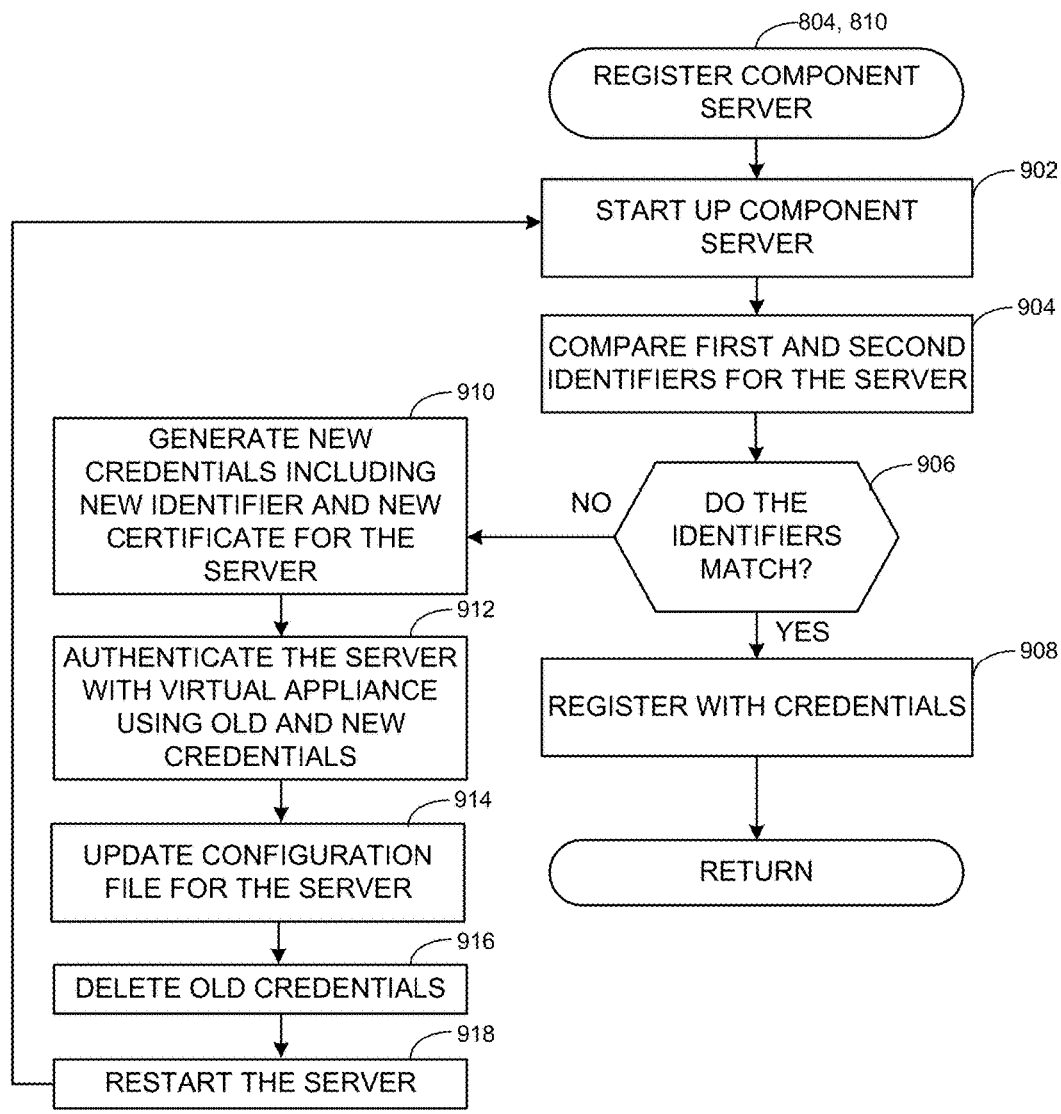

Flowcharts representative of example machine readable instructions that may be executed to deploy and manage the example application director 106, example cloud provider 110, example cloud manager 138, example distributed execution managers 146A, 146B, example multi-machine service 210, example load balancer 310, example virtual appliances 320-324, example component servers 330-336, example management endpoints 340-344, example management agents 350-356, and/or, more generally, the example systems 100 and/or 300 of FIGS. 1-7 are shown in FIGS. 8-9. In these examples, the machine readable instructions implement programs for execution by a processor such as the processor 1012 shown in the example processor platform 1000 discussed below in connection with FIG. 10. The programs may be embodied in software stored on a tangible computer readable storage medium such as a CD-ROM, a floppy disk, a hard drive, a digital versatile disk (DVD), a Blu-ray disk, or a memory associated with the processor 1012, but the entire program and/or parts thereof could alternatively be executed by a device other than the processor 1012 and/or embodied in firmware or dedicated hardware. Further, although the example programs are described with reference to the flowcharts illustrated in FIGS. 8-9, many other methods of deploying, managing, and updating workload domains in accordance with the teachings of this disclosure may alternatively be used. For example, the order of execution of the blocks may be changed, and/or some of the blocks described may be changed, eliminated, or combined.

As mentioned above, the example processes of FIGS. 8-9 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. In some examples, the example processes of FIGS. 8-9 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended. Comprising and all other variants of "comprise" are expressly defined to be open-ended terms. Including and all other variants of "include" are also defined to be open-ended terms. In contrast, the term consisting and/or other forms of consist are defined to be close-ended terms.

FIG. 8 depicts a flowchart representative of computer readable instructions that may be executed to implement the example installation and deployment of component servers 330-336. An example program 800 is illustrated in FIG. 8. Initially, at block 802, a first, main, or primary server 330 is installed. For example, a user installs and configures the component server 330 and associated management agent 350 with respect to the vA 320 in the example system 300. To set up the server 330 and agent 350, a supporting data center, desired location, component installation (e.g., Web server, app server, database server, etc.), identifier, certificate, etc., are generated based on input from a user and information from the vA 320. The identifier, certificate, etc., form a configuration file for the server 330 and its agent 350.

At block 804, the server 330 is registered with the vA 320. For example, the vA 320 and the agent 350 communicate (e.g., via the communication interface 710) to authenticate the server 330 and authorize communication between the agent 350 and endpoint 340.

At block 806, the server 330 is deployed. That is, the server 330 is made available for use by one or more users, processes, systems, etc. The agent 350 can communicate with the endpoint 340 of the vA 320 to exchange information, deploy applications, execute applications, etc. The process can be duplicated to install, register, and deploy the server 332, for example.

At block 808, the server 330 is cloned. For example, the agent 350 uses the configuration file 740 (e.g., including identifier(s), certificate, etc.) and credential information to generate (e.g., using the processor 720) a copy in the server 334 and agent 354. The agent 354 and server 334 duplicate the agent 350 and server 330 until they are further configured. The cloned agent 354 receives a new machine identifier for the server 334 as part of the cloning process. The process can be replicated to clone, register, and deploy the server 336, for example.

At block 810, the server 334 is registered with the vA 320. For example, the vA 320 and the agent 354 communicate to authenticate the server 334 and authorize communication between the agent 354 and endpoint 340. The agent 354 uses information cloned from the first server 330, such as identifier and certificate, to generate and authenticate a new identifier and certificate for the server 334, for example.

At block 812, the server 334 is deployed. That is, the server 334 is made available for use by one or more users, processes, systems, etc. The vA 320 now views the server 334 as distinct from the server 330. The agent 354 can communicate with the endpoint 340 of the vA 320 to exchange information, deploy applications, execute applications, etc. The process can be duplicated to install, register, and deploy the server 336, for example.

FIG. 9 illustrates further detail regarding an example implementation of registering the component server at blocks 804 and 810. At block 902, the component server 330, 334 starts up (e.g., is initialized, begins execution, etc.). At start up, the management agent 350, 354 of the server 330, 334 does not realize whether or not it is a cloned agent. Therefore, at block 904, the management agent 350, 354 compares a first identifier (e.g., the machine identifier 750) associated with the server 330, 334 with a second identifier stored in the configuration file 740 for the agent 350, 354. For example, the agent 350, 354 checks its configuration file 740 including the stored value of a machine identifier and compares the first identifier stored in the configuration file 740 to the second machine identifier 750 associated with the agent 350, 354 and/or the server 330, 334.

At block 906, an outcome of the comparison is evaluated. If the first and second identifiers match, then, at block 908, the server 330, 334 is registered with the vA 320 using its credentials (e.g., certificate, identifier, etc.). The server 330, 334 can then be deployed for use at block 806 or 812.

At block 910, if the first and second identifiers do not match, then the server 334 is a clone and a new certificate and identifier(s) are generated for the server 334 (e.g., by the server's 334 management agent 354, etc.). At block 912, the server 334 is authenticated with the vA 320 using the parent certificate, new certificate, and identifier(s). In certain examples, the agent 354 can use the server 330 certificate to communicate with the vA 320 without a username and password based on the parent certificate, etc. The vA 320 receives the registration call including the identifier and certificates and determines that a new node 334 exists with an identifier and certificate that can be trusted by the vA 320. The vA 320 responds with a status or acknowledgement indicating that the registration has been approved.

At block 914, the configuration file 740 associated with the agent 354 and sever 334 is updated with the new certificate, identifier(s), etc. The old certificate, identifier, etc., from the parent can be deleted so that only the new information (e.g., certificate, UUID, GUID, and/or other identifier, etc.) for the server 334 and its agent 354 are retained. At block 916, the server 334 is restarted. Thus, control returns to block 902, where the server 334 again compares identifiers (block 804). However, the identifiers now match, so the server 334 can register with the vA 320 using its credentials and be deployed (block 812) for use, for example. The vA 320 and its management endpoint 340 can then communicate distinctly with the agent 350 and/or agent 354 without confusing the two agents.

Although the example program 800 of FIGS. 8-9 is described in connection with configuring and deploying a single workload domain, the example program 800 of FIGS. 8-9 implemented in accordance with the teachings of this disclosure can be used in a multi-user scenario in which hundreds or thousands of users obtain workload domain services from the virtual server rack 206. For example, while manually configuring workload domains in a manual fashion for such quantities of users would be overly burdensome or near impossible within required time constraints, examples disclosed herein may be used to process workload domain request using the operations and management component 406 to configure and deploy large quantities of workload domains in an efficient and streamlined fashion without burdening and frustrating end users with long wait times to access such workload domains.

Figure 10:
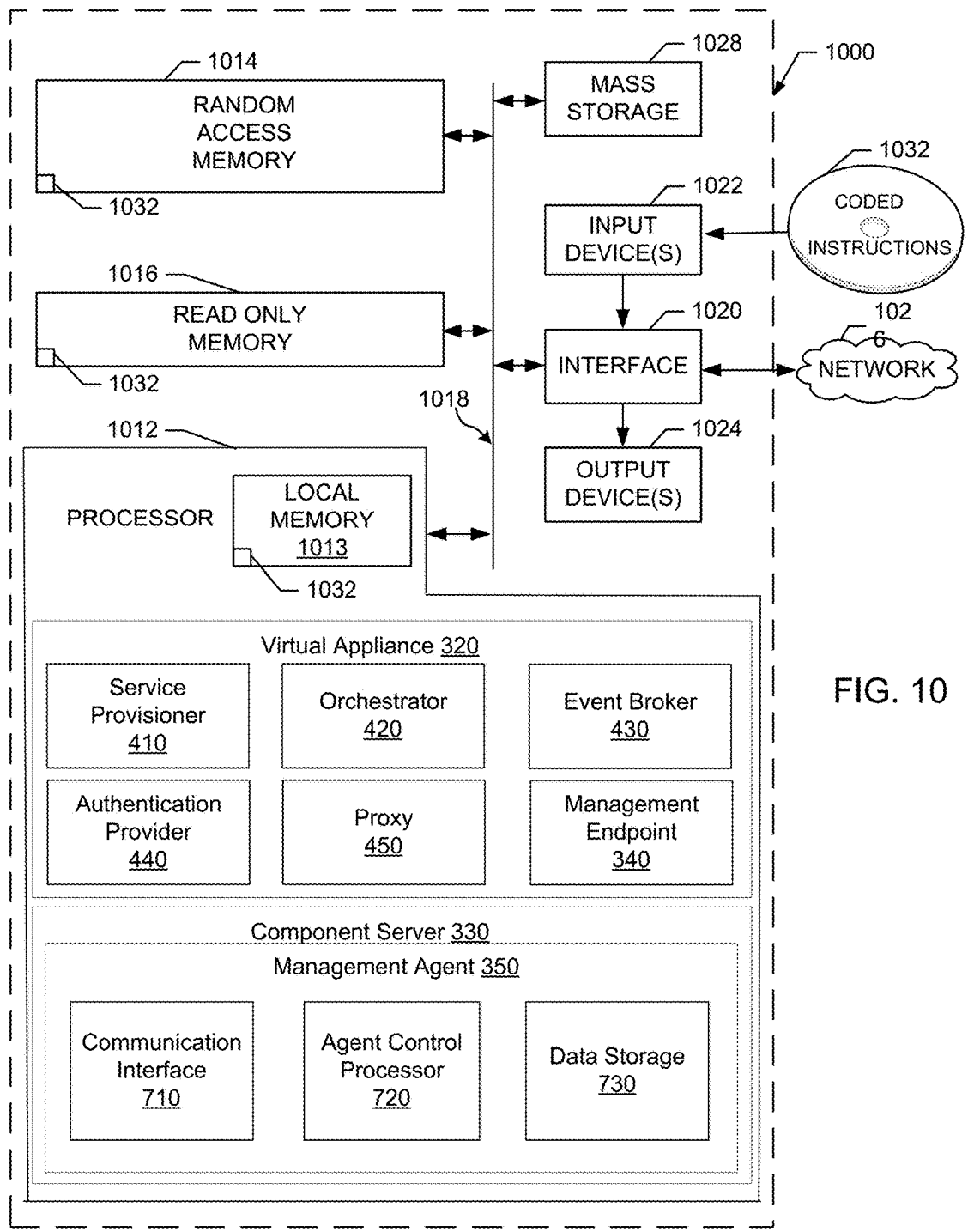
FIG. 10 is a block diagram of an example processing platform capable of executing the example machine-readable instructions of FIGS. 8-9.

FIG. 10 is a block diagram of an example processor platform 1000 capable of executing the instructions of FIGS. 8-9 to implement the example systems, operation, and management of FIGS. 1-7. The processor platform 1000 of the illustrated example includes a processor 1012. The processor 1012 of the illustrated example is hardware. For example, the processor 1012 can be implemented by one or more integrated circuits, logic circuits, microprocessors or controllers from any desired family or manufacturer.

The processor 1012 of the illustrated example includes a local memory 1013 (e.g., a cache), and executes instructions to implement the example systems 100, 300 or portions thereof, such as the vA 320-324, component server 330-336, management endpoint 340-344, and management agent 350-356. The processor 1012 of the illustrated example is in communication with a main memory including a volatile memory 1014 and a non-volatile memory 1016 via a bus 1018. The volatile memory 1014 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1016 may be implemented by flash memory and/or any other desired type of memory device. Access to the main memory 1014, 1016 is controlled by a memory controller.

The processor platform 1000 of the illustrated example also includes an interface circuit 1020. The interface circuit 1020 may be implemented by any type of interface standard, such as an Ethernet interface, a universal serial bus (USB), and/or a PCI express interface.

In the illustrated example, one or more input devices 1022 are connected to the interface circuit 1020. The input device(s) 1022 permit(s) a user to enter data and commands into the processor 1012. The input device(s) can be implemented by, for example, an audio sensor, a microphone, a keyboard, a button, a mouse, a touchscreen, a track-pad, a trackball, isopoint and/or a voice recognition system.

One or more output devices 1024 are also connected to the interface circuit 1020 of the illustrated example. The output devices 1024 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 1020 of the illustrated example, thus, typically includes a graphics driver card, a graphics driver chip or a graphics driver processor.

The interface circuit 1020 of the illustrated example also includes a communication device such as a transmitter, a receiver, a transceiver, a modem and/or network interface card to facilitate exchange of data with external machines (e.g., computing devices of any kind) via a network 1026 (e.g., an Ethernet connection, a digital subscriber line (DSL), a telephone line, coaxial cable, a cellular telephone system, etc.).

The processor platform 1000 of the illustrated example also includes one or more mass storage devices 1028 for storing software and/or data. Examples of such mass storage devices 1028 include flash devices, floppy disk drives, hard drive disks, optical compact disk (CD) drives, optical Blu-ray disk drives, RAID systems, and optical digital versatile disk (DVD) drives.

Coded instructions 1032 representative of the example machine readable instructions of FIGS. 8-9 may be stored in the mass storage device 1028, in the volatile memory 1014, in the non-volatile memory 1016, and/or on a removable tangible computer readable storage medium such as a CD or DVD.

In certain examples, the processor 1012 can be used to implement the virtual appliance 320 (and vAs 322-324) and the component server 330 (and servers 332-336) and their components including the service provisioner 410, orchestrator 420, event broker 430, authentication provider 440, proxy 450, management endpoint 340, management agent 450, communication interface 710, agent control processor 720, data storage 730, etc.

From the foregoing, it will be appreciated that the above disclosed methods, apparatus and articles of manufacture facilitate cloning an agent in a distributed environment such as a cloud computing environment and management of agents in the distributed environment. Examples disclosed herein facilitate self-evaluation and registration of cloned servers and agents without further user intervention or cloud oversight.

An example apparatus includes a first management agent associated with a first component server in a virtualization environment, the first management agent configured to facilitate communication between the first component server and a virtual appliance, the virtual appliance to authenticate the first management agent based on first credentials including a first identifier and a first certificate. The example apparatus includes a second management agent associated with a second component server in the virtualization environment, the second management agent cloned from the first management agent and including a copy of the first credentials. In the example apparatus, the second management agent is to: generate second credentials including a second identifier and a second certificate; authenticate with the virtual appliance based on the first identifier and the first certificate; and delete the copy of the first credentials.

In some examples, the second management agent compares the first identifier to a third identifier associated with the second management agent during cloning, and, when the first identifier does not match the third identifier, the second management agent triggers registration with the virtual appliance to generate the second credentials and authenticate with the virtual appliance.

In some examples, the second management agent re-starts after registration with the virtual appliance and wherein, upon re-start, the second identifier matches the third identifier.

In some examples, the second management agent operates to generate second credentials, authenticate with the virtual appliance, and delete the copy of the first credentials automatically without user input.

In some examples, a plurality of virtual appliances is included to provide tasks to a plurality of component servers. In some examples, a load balancer is included to allocate tasks among the plurality of virtual appliances. In some examples, the load balancer masks the plurality of virtual appliances and component servers to appear as a single machine to a user.

An example computer readable storage medium includes instructions that, when executed, cause a machine to implement at least a first management agent and a second management agent. In the example storage medium, the first management agent is associated with a first component server in a virtualization environment, the first management agent configured to facilitate communication between the first component server and a virtual appliance, the virtual appliance to authenticate the first management agent based on first credentials including a first identifier and a first certificate. In the example storage medium, the second management agent is associated with a second component server in the virtualization environment, the second management agent cloned from the first management agent and including a copy of the first credentials. In the example storage medium, the second management agent is to: generate second credentials including a second identifier and a second certificate; authenticate with the virtual appliance based on the first identifier and the first certificate; and delete the copy of the first credentials.

In some examples, the instructions, when executed, cause the second management agent to compare the first identifier to a third identifier associated with the second management agent during cloning, and, when the first identifier does not match the third identifier, cause the second management agent to trigger registration with the virtual appliance to generate the second credentials and authenticate with the virtual appliance.

In some examples, the instructions, when executed, cause the second management agent to re-start after registration with the virtual appliance and wherein, upon re-start, the second identifier matches the third identifier.

In some examples, the instructions, when executed, cause the second management agent to generate second credentials, authenticate with the virtual appliance, and delete the copy of the first credentials automatically without user input.

In some examples, the instructions, when executed, further cause the machine to implement a plurality of virtual appliances to provide tasks to a plurality of component servers.

In some examples, the instructions, when executed, further cause the machine to implement a load balancer to allocate tasks among the plurality of virtual appliances.

In some examples, the instructions, when executed, cause the load balancer to mask the plurality of virtual appliances and component servers to appear as a single machine to a user.

An example method includes installing, by executing an instruction with a processor, a first management agent associated with a first component server in a virtualization environment, the first management agent configured to facilitate communication between the first component server and a virtual appliance, the virtual appliance to authenticate the first management agent based on first credentials including a first identifier and a first certificate. The example method includes installing, by executing an instruction with the processor, a second management agent associated with a second component server in the virtualization environment, the second management agent cloned from the first management agent and including a copy of the first credentials. The example method includes generating, using the second management agent, second credentials including a second identifier and a second certificate. The example method includes authenticating, using the second management agent, with the virtual appliance based on the first identifier and the first certificate. The example method includes deleting, using the second management agent, the copy of the first credentials.

In some examples, the method further includes comparing, using the second management agent, the first identifier to a third identifier associated with the second management agent; and, when the first identifier does not match the third identifier, triggering, using the second management agent, registration with the virtual appliance to generate the second credentials and authenticate with the virtual appliance.

In some examples, the method further includes re-starting the second management agent after registration with the virtual appliance, wherein, upon re-start, the second identifier matches the third identifier.

In some examples, the second management agent operates to generate second credentials, authenticate with the virtual appliance, and delete the copy of the first credentials automatically without user input.

In some examples, the method further includes installing, by executing an instruction with the processor, a load balancer to allocate tasks among a plurality of virtual appliances for a plurality of component servers.

In some examples, the load balancer is to mask the plurality of virtual appliances and component servers to appear as a single machine to a user.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus comprising:
 a first management agent associated with a first component server in a virtualization environment, the first management agent configured to facilitate communication between the first component server and a virtual appliance, the virtual appliance to authenticate the first management agent based on first credentials including a first identifier and a first certificate; and
 a second management agent associated with a second component server in the virtualization environment, the second management agent cloned from the first management agent and including a copy of the first credentials from the first management agent, wherein the second management agent is to compare the first identifier to a second identifier associated with the second management agent during cloning, and wherein, when the first identifier does not match the second identifier, the second management agent is to trigger registration with the virtual appliance to:
  generate second credentials including a third identifier and a second certificate;
  authenticate with the virtual appliance based on the first identifier and the first certificate using the copy of the first credentials; and
  delete the copy of the first credentials.

2. The apparatus of claim 1, wherein the second management agent is to re-start after registration with the virtual appliance and wherein, upon re-start, the second identifier matches the third identifier.

3. The apparatus of claim 1, wherein the second management agent is to operate to generate second credentials, authenticate with the virtual appliance, and delete the copy of the first credentials automatically without user input.

4. The apparatus of claim 1, further including a plurality of virtual appliances to provide tasks to a plurality of component servers.

5. The apparatus of claim 4, further including a load balancer to allocate tasks among the plurality of virtual appliances.

6. The apparatus of claim 5, wherein the load balancer is to mask the plurality of virtual appliances and component servers to appear as a single machine to a user.

7. A tangible computer readable storage medium comprising instructions that, when executed, cause a machine to implement at least:
  a first management agent associated with a first component server in a virtualization environment, the first management agent configured to facilitate communication between the first component server and a virtual appliance, the virtual appliance to authenticate the first management agent based on first credentials including a first identifier and a first certificate; and
  a second management agent associated with a second component server in the virtualization environment, the second management agent cloned from the first management agent and including a copy of the first credentials from the first management agent, wherein the instructions, when executed, cause the second management agent to compare the first identifier to a second identifier associated with the second management agent during cloning, and wherein, when the first identifier does not match the second identifier, cause the second management agent to trigger registration with the virtual appliance to:
    generate second credentials including a third identifier and a second certificate;
    authenticate with the virtual appliance based on the first identifier and the first certificate using the copy of the first credentials; and
    delete the copy of the first credentials.

8. The storage medium of claim 7, wherein the instructions, when executed, cause the second management agent to re-start after registration with the virtual appliance and wherein, upon re-start, the second identifier matches the third identifier.

9. The storage medium of claim 7, wherein the instructions, when executed, cause the second management agent to generate second credentials, authenticate with the virtual appliance, and delete the copy of the first credentials automatically without user input.

10. The storage medium of claim 7, wherein the instructions, when executed, further cause the machine to implement a plurality of virtual appliances to provide tasks to a plurality of component servers.

11. The storage medium of claim 10, wherein the instructions, when executed, further cause the machine to implement a load balancer to allocate tasks among the plurality of virtual appliances.

12. The storage medium of claim 11, wherein the instructions, when executed, cause the load balancer to mask the plurality of virtual appliances and component servers to appear as a single machine to a user.

13. A method comprising:
  installing, by executing an instruction with a processor, a first management agent associated with a first component server in a virtualization environment, the first management agent configured to facilitate communication between the first component server and a virtual appliance, the virtual appliance to authenticate the first management agent based on first credentials including a first identifier and a first certificate;
  installing, by executing an instruction with the processor, a second management agent associated with a second component server in the virtualization environment, the second management agent cloned from the first management agent and including a copy of the first credentials from the first management agent;
  comparing, using the second management agent, the first identifier to a second identifier associated with the second management agent; and
  when the first identifier does not match the second identifier:
    generating, using the second management agent, second credentials including a third identifier and a second certificate;
    authenticating, using the second management agent, with the virtual appliance based on the first identifier and the first certificate using the copy of the first credentials; and
    deleting, using the second management agent, the copy of the first credentials.

14. The method of claim 13, further including re-starting the second management agent after registration with the virtual appliance, wherein, upon re-start, the second identifier matches the third identifier.

15. The method of claim 13, wherein the generating second credentials, authenticating with the virtual appliance, and deleting the copy of the first credentials occur automatically using the second management agent without user input.

16. The method of claim 13, further including installing, by executing an instruction with the processor, a load balancer to allocate tasks among a plurality of virtual appliances for a plurality of component servers.

17. The method of claim 16, further including masking, using the load balancer, the plurality of virtual appliances and component servers to appear as a single machine to a user.

* * * * *